(12) United States Patent
Gan

(10) Patent No.: US 11,445,411 B2
(45) Date of Patent: Sep. 13, 2022

(54) SERVICE SWITCHING PROCESSING METHOD, RELATED PRODUCT, AND COMPUTER STORAGE MEDIUM

(71) Applicant: Huawei Cloud Computing Technologies Co., Ltd., Guizhou (CN)

(72) Inventor: Lu Gan, Xi'an (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 129 days.

(21) Appl. No.: 17/029,542

(22) Filed: Sep. 23, 2020

(65) Prior Publication Data

US 2021/0007018 A1 Jan. 7, 2021

Related U.S. Application Data

(63) Continuation of application No. PCT/CN2019/078364, filed on Mar. 15, 2019.

(30) Foreign Application Priority Data

Mar. 23, 2018 (CN) .......................... 201810251267.6

(51) Int. Cl.
*H04L 67/10* (2022.01)
*H04L 67/1095* (2022.01)
(Continued)

(52) U.S. Cl.
CPC ....... *H04W 36/0011* (2013.01); *H04L 67/148* (2013.01); *H04L 67/32* (2013.01)

(58) Field of Classification Search
None
See application file for complete search history.

(56) References Cited

U.S. PATENT DOCUMENTS 10,037,231 B1 * 7/2018 Jakhetiya .............. G06F 9/5072
10,419,983 B2  9/2019 Zhu et al.
(Continued)

FOREIGN PATENT DOCUMENTS

CN  106358245 A  1/2017
CN  107404733 A  11/2017
(Continued)

OTHER PUBLICATIONS

"Mobile-Edge Computing (MEC); Technical Requirements," Draft ETSI GS MEC 002, Sep. 15, 2015, pp. 1-41, XP014250039.
(Continued)

*Primary Examiner* — Ajit Patel
(74) *Attorney, Agent, or Firm* — Conley Rose, P.C.

(57) ABSTRACT

A source mobile edge computing (MEC) platform sends first indication information to an application server (AS) when determining that a target application is to stop processing service data of user equipment (UE), wherein the first indication information indicates that the service data of the UE is to be processed in the AS. The target application is deployed on the source MEC platform to process the service data of the UE. The AS is configured to respond to the first indication information and send a first response message to the source MEC platform, wherein the first response message indicates that the AS is ready to process the service data of the UE.

19 Claims, 8 Drawing Sheets

(51) Int. Cl.
*H04W 36/00* (2009.01)
*H04L 67/148* (2022.01)
*H04L 67/60* (2022.01)

(56) References Cited

U.S. PATENT DOCUMENTS

| | | | |
|---|---|---|---|
| 2017/0086049 A1 | 3/2017 | Vrzic | |
| 2018/0183855 A1* | 6/2018 | Sabella | H04L 67/04 |
| 2018/0242204 A1 | 8/2018 | Zhu et al. | |
| 2018/0352038 A1* | 12/2018 | Sathyanarayana | H04L 67/10 |
| 2019/0058767 A1* | 2/2019 | Chandramouli | H04L 12/14 |
| 2019/0090167 A1 | 3/2019 | Lu et al. | |
| 2019/0191344 A1* | 6/2019 | Wen | G06F 9/45558 |
| 2019/0215381 A1* | 7/2019 | Mukund | H04L 43/0876 |
| 2021/0076250 A1* | 3/2021 | Wang | H04W 72/087 |

FOREIGN PATENT DOCUMENTS

| | | | |
|---|---|---|---|
| CN | 107454632 A | 12/2017 | |
| CN | 107484210 A | 12/2017 | |
| CN | 107566437 A | 1/2018 | |
| CN | 107113662 B | 8/2020 | |
| WO | 2017066945 A1 | 4/2017 | |
| WO | 2017091960 A1 | 6/2017 | |
| WO | 2017197564 A1 | 11/2017 | |
| WO | WO-2019161527 A1 * | 8/2019 | G06Q 10/06315 |

OTHER PUBLICATIONS

"Mobile Edge Computing (MEC); Framework and Reference Architecture," Dec. 1, 2017, pp. 1-18, XP014303916.

* cited by examiner

SERVICE SWITCHING PROCESSING METHOD, RELATED PRODUCT, AND COMPUTER STORAGE MEDIUM

CROSS-REFERENCE TO RELATED APPLICATIONS

This application is a continuation application of International Patent Application No. PCT/CN2019/078364, filed on Mar. 15, 2019, which claims priority to Chinese Patent Application No. 201810251267.6, filed on Mar. 23, 2018. The disclosures of the aforementioned applications are hereby incorporated by reference in their entireties.

TECHNICAL FIELD

The present disclosure relates to the field of communications technologies, and in particular, to a service switching processing method, a related device, and a computer storage medium.

BACKGROUND

To reduce computing load of an application server (AS) and a transmission latency between user equipment (UE) and the server AS, a mobile edge computing (MEC) platform deployed nearby a UE side is specially designed to process service data of the UE. Specifically, a corresponding application app is designed on the MEC platform to process the service data of the UE.

In actual application, when the UE sends a service processing request to the server AS on a network, the service processing request is routed to a target application on the MEC platform for processing. Generally, to reduce costs, one MEC platform may be shared by (or deployed for) one or more base stations evolved NodeBs (eNBs). As a result, it is found in practice that when the UE is handed over to a base station for which no MEC platform is deployed, or is handed over to a base station that corresponds to a MEC platform but the platform is not provided with a target application used to process the service data of the UE, a service between the UE and a source MEC platform is interrupted during the handover, and reliability and efficiency of service processing are reduced.

SUMMARY

Embodiments of the present disclosure disclose a service switching processing method, a related product, and a computer storage medium, to resolve a problem in other approaches such as interruption of a service between UE and a source MEC platform during a handover of the UE.

According to a first aspect, an embodiment of the present disclosure discloses a service switching processing system. The system includes a source MEC platform and a cloud server AS, where the source MEC platform is configured to send first indication information to the AS when determining that a target application is to stop processing service data of UE, where the first indication information is used to indicate that the service data of the UE is to be processed in the AS, the target application is deployed on the source MEC platform, and the target application is an application used to process the service data of the UE, and the AS is configured to respond to the first indication information and send a first response message to the source MEC platform, where the first response message is used to indicate that the AS is ready to process the service data of the UE.

Implementing this embodiment of the present disclosure can resolve a problem in other approaches such as interruption of a service between the UE and the source MEC platform during a handover of the UE.

In some possible embodiments, the determining that a target application is to stop processing service data of UE includes obtaining, by the source MEC platform, an operation instruction for the target application, or receiving, by the source MEC platform, a handover notification sent by a base station, where the operation instruction includes at least one of an update instruction, an uninstallation instruction, and a reconfiguration instruction. The update instruction is used as an example. When the source MEC platform detects an update operation such as an upgrade or patching on the target application deployed on the source MEC platform, because the target application cannot provide a corresponding service in an update process, it may be determined that the source MEC platform is to stop processing the service data of the UE.

In some possible embodiments, the first indication information is used to instruct the AS to switch a user status to an active state, to wait to process the service data of the UE, where the user status in the AS is used to indicate whether the service data of the UE is processed in the AS, and the AS is specifically configured to switch the user status to the active state based on an indication of the first indication information, and send the first response message to the source MEC platform, where the first response message is further used to indicate that the AS has switched the user status to the active state.

In some possible embodiments, the first indication information is further used to instruct to request to enable a function of data synchronization between the source MEC platform and the AS, to synchronize, to the AS for processing, the service data of the UE that is stored on the source MEC platform, where the first response message is further used to indicate that the function of data synchronization between the source MEC platform and the AS is allowed to be enabled.

In some possible embodiments, the source MEC platform is further configured to send the stored service data of the UE to the AS for processing. The AS is further configured to receive the service data of the UE that is sent by the source MEC platform, and process the service data of the UE.

In some possible embodiments, the first indication information is further used to instruct the AS to apply for a first resource, and the first resource is a resource (which may be specifically a computing resource and a storage resource, such as a memory resource and a thread resource) used by the AS to process the service data of the UE, and the AS is specifically configured to apply for the first resource for the UE based on an indication of the first indication information, and send the first response message to the source MEC platform, where the first response message is further used to indicate that the AS has applied for the first resource.

In some possible embodiments, the system further includes the UE. Before the source MEC platform sends the first indication information to the AS, the UE is further configured to send a first creation request to the AS, where the first creation request carries a first channel parameter, and is used to request to create a first channel used for communication between the UE and the AS. The AS is further configured to send a first creation response to the UE in response to the first creation request, where the first creation response is used to indicate that the first channel has been successfully created.

In some possible embodiments, before the source MEC platform sends the first indication information to the AS, the UE is configured to send a second creation message to the source MEC platform, where the second creation message carries a second channel parameter, and is used to request to create a second channel used for communication between the UE and the source MEC platform, to send the service data of the UE to the source MEC platform on the second channel for processing, the source MEC platform is configured to after receiving the second creation message, send second indication information to the AS, where the second indication information is used to instruct not to process the service data of the UE in the AS, and the second creation message is used to request to create the second channel used for communication between the UE and the source MEC platform, the AS is configured to respond to the second indication information and send a second response message to the source MEC platform, where the second response message is used to indicate that the AS has determined not to process the service data of the UE, and the source MEC platform is further configured to send a second creation response to the UE after receiving the second response message, where the second creation response is used to indicate that the second channel has been successfully created.

It should be noted that the first channel is created prior to the second channel.

In some possible embodiments, the second indication information is used to instruct the AS to switch the user status to an idle state, to not process the service data of the UE in the AS, and the AS is specifically configured to switch the user status to the idle state based on an indication of the second indication information, and send the second response message to the source MEC platform, where the second response message is further used to indicate that the AS has switched the user status to the idle state.

In some possible embodiments, the second indication information is further used to instruct the AS to release a second resource, and the second resource is a resource used by the AS to process the service data of the UE, and the AS is specifically configured to release the second resource based on an indication of the second indication information, and send the second response message to the source MEC platform, where the second response message is further used to indicate that the AS has released the second resource.

In some possible embodiments, after the service data of the UE starts to be synchronized between the source MEC platform and the AS, the AS is further configured to send third indication information to the UE, where the third indication information is used to instruct to send the service data of the UE to the AS for processing. The UE is further configured to respond to the third indication information and send a third response message to the AS, where the third response message is used to indicate that the UE has determined to send the service data of the UE to the AS for processing.

In some possible embodiments, the third indication information is used to instruct the UE to switch from the second channel to the first channel, to send the service data of the UE to the AS on the first channel for processing. The first channel is a channel used for communication between the UE and the AS, the second channel is a channel used for communication between the UE and the source MEC platform, and the first channel is created prior to the second channel, and the third response message is used to indicate that the UE has switched from the second channel to the first channel.

In some possible embodiments, the UE is further configured to send the service data of the UE to the AS for processing, and the AS is further configured to receive and process the service data of the UE.

In some possible embodiments, after the service data of the UE has been synchronized between the source MEC platform and the AS, the AS is further configured to send fourth indication information to the source MEC platform, where the fourth indication information is used to instruct to wait for a communication disconnection between the source MEC platform and the UE. The source MEC platform is further configured to wait for the communication disconnection between the source MEC platform and the UE based on an indication of the fourth indication information.

In some possible embodiments, the fourth indication information is used to instruct the source MEC platform to switch a user status of the target application to a waiting state, to wait for the communication disconnection between the source MEC platform and the UE, and the source MEC platform is specifically configured to switch the user status of the target application to the waiting state based on an indication of the fourth indication information.

In some possible embodiments, the fourth indication information is further used to instruct the source MEC platform to release a third resource, and the third resource is a computing resource and a storage resource that are used by the source MEC platform to process the service data of the UE, and the source MEC platform is specifically configured to release the third resource based on the indication of the fourth indication information.

In some possible embodiments, the source MEC platform is further configured to after detecting that the UE leaves the source MEC platform or the target application on the source MEC platform stops processing the service data of the UE, determine that communication between the source MEC platform and the UE is disconnected.

In some possible embodiments, the source MEC platform is further configured to after detecting that the UE leaves the source MEC platform, release a channel resource occupied between the source MEC platform and the UE, for example, a socket resource.

In some possible embodiments, the system further includes a target MEC platform, where the UE is further configured to send a third creation request to the target MEC platform when the UE is handed over from the source MEC platform to the target MEC platform, or when the target application on the target MEC platform re-supports processing of the service data of the UE, where the third creation request carries a third channel parameter, and is used to request to create a third channel used for communication between the UE and the target MEC platform, to transmit the service data of the UE to the target MEC platform on the third channel for processing, and the target application is deployed on the target MEC platform, and the target MEC platform is configured to receive the third creation request, create the third channel based on the third channel parameter, and send a third creation response to the UE, where the third creation response is used to indicate that the third channel has been successfully created.

In some possible embodiments, the target MEC platform is further configured to send a data synchronization request to the AS, to request to synchronize, to the target MEC platform for processing, the service data of the UE that is stored in the AS. The AS is further configured to receive the data synchronization request, and send a data synchronization response to the target MEC platform, where the data synchronization response is used to indicate that synchronization of the service data of the UE between the target MEC platform and the AS is allowed.

In some possible embodiments, the AS is further configured to send the stored service data of the UE to the target MEC platform for processing. The target MEC platform is further configured to receive and process the service data of the UE.

In some possible embodiments, after the service data of the UE starts to be synchronized between the target MEC platform and the AS, the target MEC platform is further configured to send fifth indication information to the UE, where the fifth indication information is used to instruct to send the service data of the UE to the target MEC platform for processing. The UE is further configured to respond to the fifth indication information and send a fifth response message to the target MEC platform, where the fifth response message is used to indicate that the UE has determined to send the service data of the UE to the target MEC platform for processing.

In some possible embodiments, the fifth indication information is used to instruct the UE to switch from the second channel to the third channel, to send the service data of the UE to the target MEC platform on the third channel for processing, and the UE is specifically configured to switch from the second channel to the third channel based on an indication of the fifth indication information, and send the fifth response message to the target MEC platform, where the fifth response message is used to indicate that the UE has switched from the second channel to the third channel.

In some possible embodiments, after the service data of the UE has been synchronized between the target MEC platform and the AS, the target MEC platform is further configured to send sixth indication information to the AS, where the sixth indication information is used to instruct not to process the service data of the UE in the AS. The AS is further configured to respond to the sixth indication information and send a sixth response message to the target MEC platform, where the sixth response message is used to indicate that the AS has determined not to process the service data of the UE.

In some possible embodiments, the sixth indication information is used to instruct the AS to switch the user status to the idle state, to not process the service data of the UE in the AS, and the AS is specifically configured to switch the user status to the idle state based on an indication of the sixth indication information, and send the sixth response message to the target MEC platform, where the sixth response message is further used to indicate that the AS has switched the user status to the idle state.

In some possible embodiments, the sixth indication information is further used to instruct the AS to release a fourth resource, and the fourth resource is a resource (which may be specifically a computing resource and a storage resource) used by the AS to process the service data of the UE, and the AS is specifically configured to release the fourth resource based on the indication of the sixth indication information, and send the sixth response message to the target MEC platform, where the sixth response message is further used to indicate that the AS has released the fourth resource.

According to a second aspect, this application provides a service switching processing method, applied to a source MEC platform. The method includes sending, by the source MEC platform, first indication information to the AS when determining that a target application is to stop processing service data of UE, where the first indication information is used to indicate that the service data of the UE is to be processed in the AS, the target application is deployed on the source MEC platform, and the target application is an application used to process the service data of the UE, and receiving, by the source MEC platform, a first response message returned by the AS, where the first response message is used to indicate that the AS is ready to process the service data of the UE.

According to a third aspect, this application provides another service switching processing method, applied to a cloud server AS. The method includes receiving, by the AS, first indication information sent by a source MEC platform, where the first indication information is used to indicate that service data of UE is to be processed in the AS, and responding to the first indication information and sending a first response message to the source MEC platform, where the first response message is used to indicate that the AS is ready to process the service data of the UE.

According to a fourth aspect, this application provides another service switching processing method, applied to a target MEC platform. The method includes receiving, by the target MEC platform, a third creation request sent by the UE, where the third creation request carries a third channel parameter, and is used to request to create a third channel used for communication between the UE and the target MEC platform, to transmit service data of the UE to the target MEC platform on the third channel for processing, a target application is deployed on the target MEC platform, and the target application is an application used to process the service data of the UE, and creating the third channel based on the third channel parameter, and sending a third creation response to the UE, where the third creation response is used to indicate that the third channel has been successfully created.

According to a fifth aspect, this application provides another service switching processing method, applied to UE. The method includes sending, by the UE, a creation request to a target device, where the creation request carries a channel parameter preset in the UE and is used to request to create a channel used for communication between the UE and the target device, and receiving a creation response returned by the target device, where the creation response is used to indicate that the channel has been successfully created.

In some possible embodiments, when the creation request is a first creation request, the first creation request carries a first channel parameter, and is used to request to create a first channel used for communication between the UE and a cloud server AS, to send service data of the UE to the AS on the first channel for processing, when the creation request is a second creation request, the second creation request carries a second channel parameter, and is used to request to create a second channel used for communication between the UE and a source MEC platform, to send service data of the UE to the source MEC platform on the second channel for processing, or when the creation request is a third creation request, the third creation request carries a third channel parameter, and is used to request to create a third channel used for communication between the UE and a target MEC platform, to send service data of the UE to the target MEC platform on the third channel for processing.

With reference to any one or more of the second aspect to the fifth aspect, in some possible embodiments, the determining that a target application is to stop processing service data of UE includes obtaining, by the source MEC platform, an operation instruction for the target application, or receiving, by the source MEC platform, a handover notification sent by a base station. The operation instruction includes at least one of an update instruction, an uninstallation instruction, and a reconfiguration instruction.

With reference to any one or more of the second aspect to the fifth aspect, in some possible embodiments, the first indication information is used to instruct the AS to switch a user status to an active state, to wait to process the service data of the UE. The user status in the AS is used to indicate whether the service data of the UE is processed in the AS, and the AS switches the user status to the active state based on an indication of the first indication information, and sends the first response message to the source MEC platform, where the first response message is further used to indicate that the AS has switched the user status to the active state.

With reference to any one or more of the second aspect to the fifth aspect, in some possible embodiments, the first indication information is further used to instruct to request to enable a function of data synchronization between the source MEC platform and the AS, to synchronize, to the AS for processing, the service data of the UE that is stored on the source MEC platform, where the first response message is further used to indicate that the function of data synchronization between the source MEC platform and the AS is allowed to be enabled.

With reference to any one or more of the second aspect to the fifth aspect, in some possible embodiments, the source MEC platform sends the stored service data of the UE to the AS for processing. Correspondingly, the AS receives the service data of the UE that is sent by the source MEC platform, and processes the service data of the UE.

With reference to any one or more of the second aspect to the fifth aspect, in some possible embodiments, the first indication information is further used to instruct the AS to apply for a first resource, and the first resource is a resource used by the AS to process the service data of the UE. Correspondingly, the AS applies for the first resource for the UE based on an indication of the first indication information, and sends the first response message to the source MEC platform. The first response message is further used to indicate that the AS has applied for the first resource.

With reference to any one or more of the second aspect to the fifth aspect, in some possible embodiments, before the source MEC platform sends the first indication information to the AS, the method further includes sending, by the UE, a first creation request to the AS, where the first creation request carries a first channel parameter, and is used to request to create a first channel used for communication between the UE and the AS, and correspondingly, sending, by the AS, a first creation response to the UE in response to the first creation request, where the first creation response is used to indicate that the first channel has been successfully created, and receiving, by the UE, the first creation response message sent by the AS.

With reference to any one or more of the second aspect to the fifth aspect, in some possible embodiments, before the source MEC platform sends the first indication information to the AS, the UE sends a second creation message to the source MEC platform, where the second creation message carries a second channel parameter, and is used to request to create a second channel used for communication between the UE and the source MEC platform, to send the service data of the UE to the source MEC platform on the second channel for processing, correspondingly, after receiving the second creation message, the source MEC platform sends second indication information to the AS, where the second indication information is used to instruct not to process the service data of the UE in the AS, and the second creation message is used to request to create the second channel used for communication between the UE and the source MEC platform, the AS receives the second indication information, responds to the second indication information, and sends a second response message to the source MEC platform, where the second response message is used to indicate that the AS has determined not to process the service data of the UE, and correspondingly, after receiving the second response message, the source MEC platform sends a second creation response to the UE, where the second creation response is used to indicate that the second channel has been successfully created, and the UE receives the second creation response sent by the source MEC platform.

With reference to any one or more of the second aspect to the fifth aspect, in some possible embodiments, the second indication information is used to instruct the AS to switch the user status to an idle state, to not process the service data of the UE in the AS. The AS switches the user status to the idle state based on an indication of the second indication information, and sends the second response message to the source MEC platform, where the second response message is further used to indicate that the AS has switched the user status to the idle state.

With reference to any one or more of the second aspect to the fifth aspect, in some possible embodiments, the second indication information is further used to instruct the AS to release a second resource, and the second resource is a resource used by the AS to process the service data of the UE. The AS releases the second resource based on the indication of the second indication information, and sends the second response message to the source MEC platform, where the second response message is further used to indicate that the AS has released the second resource.

With reference to any one or more of the second aspect to the fifth aspect, in some possible embodiments, after the service data of the UE starts to be synchronized between the source MEC platform and the AS, the method further includes sending, by the AS, third indication information to the UE, where the third indication information is used to instruct to send the service data of the UE to the AS for processing, correspondingly, responding to, by the UE, the third indication information, and sending a third response message to the AS, where the third response message is used to indicate that the UE has determined to send the service data of the UE to the AS for processing, and receiving, by the AS, the third response message sent by the UE.

With reference to any one or more of the second aspect to the fifth aspect, in some possible embodiments, the third indication information is used to instruct the UE to switch from the second channel to the first channel, to send the service data of the UE to the AS on the first channel for processing. The first channel is a channel used for communication between the UE and the AS, the second channel is a channel used for communication between the UE and the source MEC platform, and the first channel is created prior to the second channel. The third response message is used to indicate that the UE has switched from the second channel to the first channel.

With reference to any one or more of the second aspect to the fifth aspect, in some possible embodiments, the method further includes sending, by the UE, the service data of the UE to the AS for processing, and correspondingly, receiving and processing, by the AS, the service data of the UE.

With reference to any one or more of the second aspect to the fifth aspect, in some possible embodiments, after the service data of the UE has been synchronized between the source MEC platform and the AS, the AS sends fourth indication information to the source MEC platform, where the fourth indication information is used to instruct to wait for a communication disconnection between the source MEC platform and the UE. Correspondingly, the source MEC platform waits for the communication disconnection between the source MEC platform and the UE based on an indication of the fourth indication information.

With reference to any one or more of the second aspect to the fifth aspect, in some possible embodiments, the fourth indication information is used to instruct the source MEC platform to switch a user status of the target application to a waiting state, to wait for a communication disconnection between the source MEC platform and the UE. The source MEC platform switches the user status of the target application to the waiting state based on the indication of the fourth indication information.

With reference to any one or more of the second aspect to the fifth aspect, in some possible embodiments, the fourth indication information is further used to instruct the source MEC platform to release a third resource, and the third resource is a computing resource and a storage resource that are used by the source MEC platform to process the service data of the UE. The source MEC platform releases the third resource based on the indication of the fourth indication information.

With reference to any one or more of the second aspect to the fifth aspect, in some possible embodiments, the method further includes after detecting that the UE leaves the source MEC platform or the target application on the source MEC platform stops processing the service data of the UE, determining, by the source MEC platform, that communication between the source MEC platform and the UE is disconnected.

With reference to any one or more of the second aspect to the fifth aspect, in some possible embodiments, the method further includes sending, by the UE, a third creation request to the target MEC platform when the UE is handed over from the source MEC platform to the target MEC platform, or when the target application on the target MEC platform re-supports processing of the service data of the UE, where the third creation request carries a third channel parameter, and is used to request to create a third channel used for communication between the UE and the target MEC platform, to transmit the service data of the UE to the target MEC platform on the third channel for processing, and the target application is deployed on the target MEC platform, and correspondingly, receiving, by the target MEC platform, the third creation request, creating the third channel based on the third channel parameter, and sending a third creation response to the UE, where the third creation response is used to indicate that the third channel has been successfully created.

With reference to any one or more of the second aspect to the fifth aspect, in some possible embodiments, the method further includes sending, by the target MEC platform, a data synchronization request to the AS, to request to synchronize, to the target MEC platform for processing, the service data of the UE that is stored in the AS, and receiving, by the AS, the data synchronization request, and sending a data synchronization response to the target MEC platform, where the data synchronization response is used to indicate that synchronization of the service data of the UE between the target MEC platform and the AS is allowed.

With reference to any one or more of the second aspect to the fifth aspect, in some possible embodiments, the method further includes sending, by the AS, the stored service data of the UE to the target MEC platform for processing, and correspondingly, receiving and processing, by the target MEC platform, the service data of the UE.

With reference to any one or more of the second aspect to the fifth aspect, in some possible embodiments, after the service data of the UE starts to be synchronized between the target MEC platform and the AS, the method further includes sending, by the target MEC platform, fifth indication information to the UE, where the fifth indication information is used to instruct to send the service data of the UE to the target MEC platform for processing, and correspondingly, responding to, by the UE, the fifth indication information, and sending a fifth response message to the target MEC platform, where the fifth response message is used to indicate that the UE has determined to send the service data of the UE to the target MEC platform for processing.

With reference to any one or more of the second aspect to the fifth aspect, in some possible embodiments, the fifth indication information is used to instruct the UE to switch from the second channel to the third channel, to send the service data of the UE to the target MEC platform on the third channel for processing. The UE switches from the second channel to the third channel based on an indication of the fifth indication information, and sends a fifth response message to the target MEC platform, where the fifth response message is used to indicate that the UE has switched from the second channel to the third channel.

With reference to any one or more of the second aspect to the fifth aspect, in some possible embodiments, after the service data of the UE has been synchronized between the target MEC platform and the AS, the method further includes sending, by the target MEC platform, sixth indication information to the AS, where the sixth indication information is used to instruct not to process the service data of the UE in the AS, and correspondingly, responding to, by the AS, the sixth indication information, and sending a sixth response message to the target MEC platform, where the sixth response message is used to indicate that the AS has determined not to process the service data of the UE.

With reference to any one or more of the second aspect to the fifth aspect, in some possible embodiments, the sixth indication information is used to instruct the AS to switch the user status to the idle state, to not process the service data of the UE in the AS. The AS switches the user status to the idle state based on an indication of the sixth indication information, and sends the sixth response message to the target MEC platform, where the sixth response message is further used to indicate that the AS has switched the user status to the idle state.

With reference to any one or more of the second aspect to the fifth aspect, in some possible embodiments, the sixth indication information is further used to instruct the AS to release a fourth resource, and the fourth resource is a resource used by the AS to process the service data of the UE. The AS releases the fourth resource based on the indication of the sixth indication information, and sends the sixth response message to the target MEC platform, where the sixth response message is further used to indicate that the AS has released the fourth resource.

According to a sixth aspect, an embodiment of the present disclosure discloses a source MEC platform, including a functional unit configured to perform the method according to the second aspect.

According to a seventh aspect, an embodiment of the present disclosure discloses a cloud server AS, including a functional unit configured to perform the method according to the third aspect.

According to an eighth aspect, an embodiment of the present disclosure discloses a target MEC platform, including a functional unit configured to perform the method according to the fourth aspect.

According to a ninth aspect, an embodiment of the present disclosure discloses UE, including a functional unit configured to perform the method according to the fifth aspect.

According to a tenth aspect, an embodiment of the present disclosure provides another network device, including a memory, a communications interface, and a processor coupled to the memory and the communications interface. The memory is configured to store an instruction, the processor is configured to execute the instruction, and the communications interface is configured to communicate with another device (for example, UE, a cloud server AS, or a network device on which a source MEC platform or a target MEC platform is deployed) under control of the processor. When executing the instruction, the processor performs the method according to any one of the second aspect to the fourth aspect.

According to an eleventh aspect, an embodiment of the present disclosure provides another UE, including a memory, a communications interface, and a processor coupled to the memory and the communications interface. The memory is configured to store an instruction, the processor is configured to execute the instruction, and the communications interface is configured to communicate with another device (which may be specifically a cloud server, a network device on which a target MEC platform or a source MEC platform is deployed, or the like) under control of the processor. When executing the instruction, the processor performs the method according to the fifth aspect.

According to a twelfth aspect, a computer-readable storage medium is provided. The computer-readable storage medium stores program code for service switching processing. The program code includes an instruction used to perform the method according to any one of the second aspect to the fifth aspect.

According to a thirteenth aspect, a computer program product including an instruction is provided. When the computer program product runs on a computer, the computer is enabled to perform the method according to any one of the second aspect to the fifth aspect.

Implementing the embodiments of the present disclosure can resolve the problem in other approaches such as interruption of a service between the UE and the source MEC platform after the UE is handed over from the source MEC platform, and improve reliability and efficiency of service processing.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following describes the technical solutions in the embodiments of the present disclosure in detail with reference to the accompanying drawings in the present disclosure.

In a process of proposing this application, the applicant finds that, to reduce a transmission latency between UE and a cloud server AS, a concept of a MEC platform is proposed. Specifically, a target application is deployed on the MEC platform, to process service data of the UE. The UE does not perceive existence of the MEC platform. After the MEC platform including the target application is deployed on a network, a service processing request sent by the UE to the network is routed to the target application on the MEC platform for processing. Generally, to reduce costs, one or more base stations eNBs may share one MEC platform.

Correspondingly, in a process in which the UE is handed over between base stations, the UE is also handed over between MEC platforms. There may be the following possible cases The UE is handed over to a base station for which no MEC platform is deployed, or is handed over to a corresponding base station for which a MEC platform is deployed, but the platform has no target application. In this case, a service between the UE and a source MEC platform is interrupted.

Figure 1:
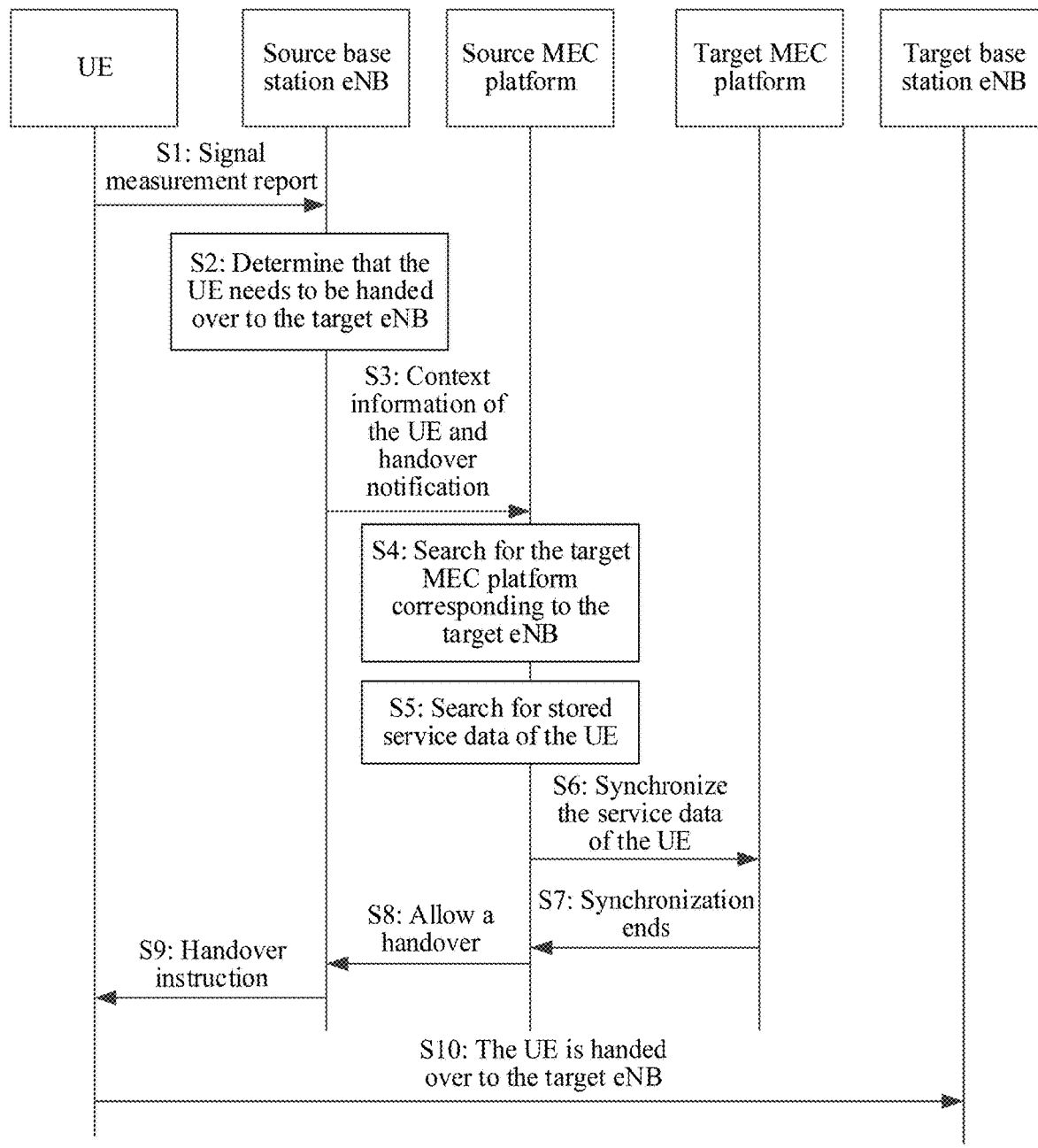
FIG. 1 is a schematic flowchart of a service switching processing method in other approaches.

In addition, an existing handover procedure between MEC platforms is as follows A service switching processing procedure for the MEC platform is combined with a base station eNB handover procedure. Specifically, FIG. 1 is a schematic flowchart of a service switching processing method according to other approaches. As shown in FIG. 1, the method may include the following implementation steps S1 UE reports a signal measurement report to a source base station eNB. Correspondingly, the source base station receives the signal measurement report reported by the UE.

S2 After receiving the signal measurement report reported by the UE, the source base station eNB may determine, based on a parameter (for example, cell signal quality) in the signal measurement report, that the UE needs to be handed over to a target base station eNB.

S3 Further, the source base station may obtain context information of the to-be-handed-over UE, and send a handover notification to a source MEC platform correspondingly deployed for the source base station, where the handover notification is used to notify the source MEC platform that the UE is to be handed over to the target base station eNB. Optionally, the handover notification may carry information such as an identifier of the target base station, an identifier of the UE, and an identifier of the source base station. Correspondingly, the source MEC platform receives the handover notification.

S4 The source MEC platform searches, based on the identifier of the target base station, for a target MEC platform correspondingly deployed for the target base station. Specifically, the source MEC platform searches, based on the identifier of the target base station, a locally configured mapping table for the target MEC platform corresponding to the target base station. The mapping table is self-defined and configured on a user side or a source MEC platform side. The mapping table may include MEC platforms respectively corresponding to a plurality of base stations. The plurality of base stations may include but are not limited to a neighboring-cell base station of the source base station or the like. The plurality of base stations include at least the target base station, that is, the mapping table includes at least a mapping relationship between the target base station and the target MEC platform.

S5 Further, the source MEC platform searches, based on the identifier of the UE, for service data (which may be also referred to as application data) of the UE that is stored on the source MEC platform.

S6 Further, the source MEC platform sends the service data of the UE to the target MEC platform. Correspondingly, the target MEC platform receives the service data of the UE.

S7 After synchronously receiving the service data of the UE, the target MEC platform sends a first response message to the source MEC platform, where the first response message is used to indicate that the service data of the UE has been synchronized. Correspondingly, the source MEC platform receives the first response message.

S8 After receiving the first response message, the source MEC platform sends a second response message to the source base station, where the second response message is used to indicate that the UE is allowed to be handed over from the source base station or the source MEC platform. Correspondingly, the source base station receives the second response message.

S9 After receiving the second response message, the source base station sends a handover instruction to the UE, to indicate that the UE is allowed to be handed over from the source base station to the target base station, that is, the UE is allowed to be handed over from the source MEC platform to the target MEC platform.

S10 After receiving the handover instruction, the UE is handed over from the source base station to the target base station.

FIG. 1 shows an existing service switching processing procedure for a MEC platform, and there are the following several disadvantages First, in a movement process of the UE, the UE is handed over to a base station for which no target MEC platform is deployed, or is handed over to a base station for which a target MEC platform is deployed, but the target MEC platform has no target application and cannot process the service data of the UE. In this case, a service between the UE and the source MEC platform is interrupted, hitless service processing cannot be implemented, and service processing reliability is reduced.

Second, in the existing service switching processing procedure for a MEC platform, the source MEC platform needs to store a mapping table. The mapping table includes information such as a MEC platform correspondingly deployed for a neighboring base station, to determine, in a UE handover process, the target MEC platform corresponding to the target base station. It may be understood that information in the mapping table is usually manually configured by a user, and depends on an active behavior of the user. In addition, a configuration operation is very complex, maintenance costs are relatively high, and popularization is difficult.

Third, because the target MEC platform does not have the service data (or the application data) of the UE, in the UE handover process, synchronization of the service data of the UE needs to be completed between the target MEC platform and the source MEC platform. When there is a relatively large amount of service data (for example, video data) of the UE, duration of handing over the UE from the source base station or the source MEC platform is increased, and the UE cannot access the target base station or the target MEC platform in time. In this case, because signal quality of the source base station is reduced, a problem such as communication interruption may occur.

Figure 2:
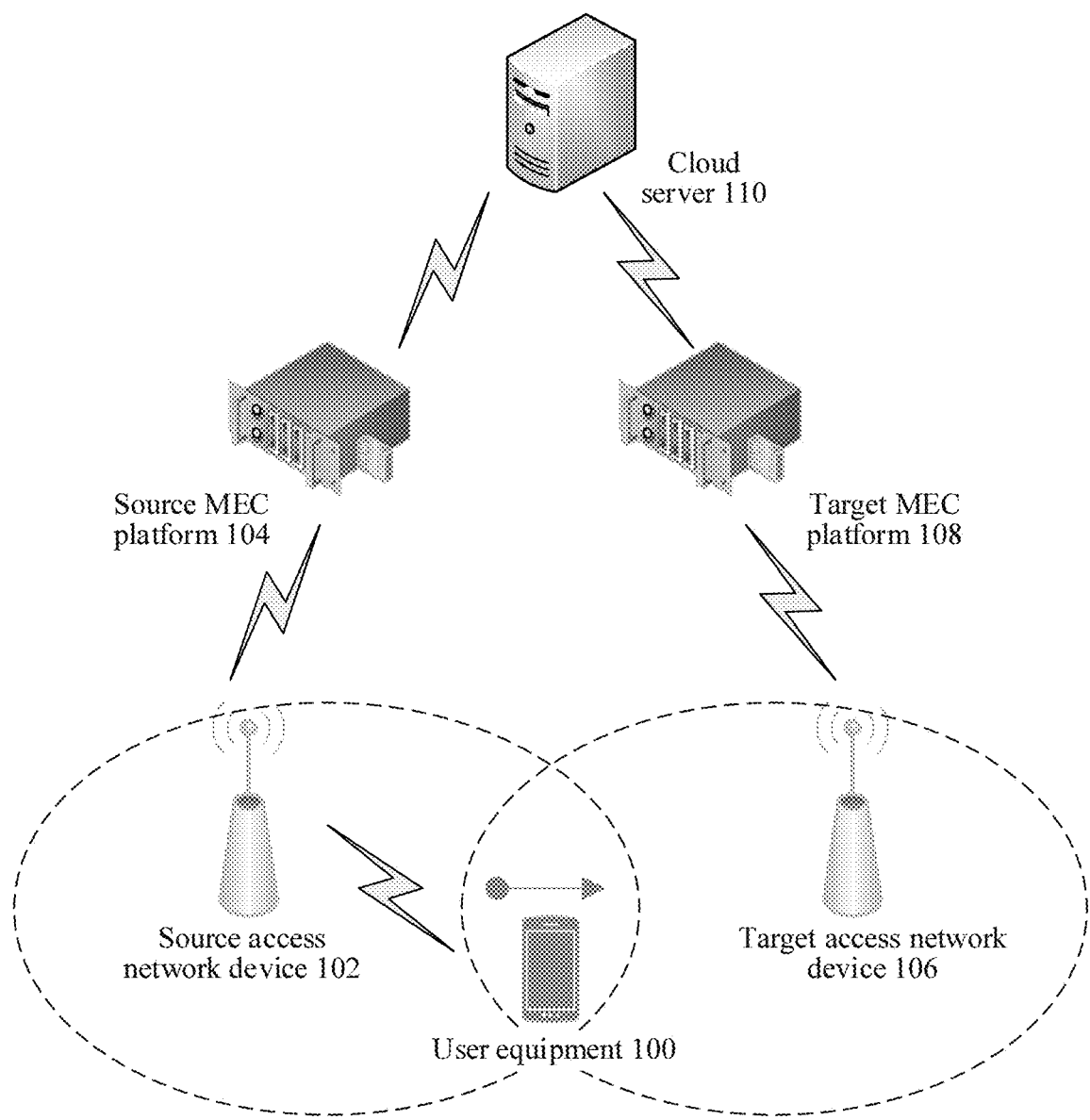
FIG. 2 is a schematic diagram of a network framework according to an embodiment of the present disclosure.

To resolve the foregoing disadvantages, this application provides a service switching processing method and a network framework to which the method is applicable. The following first describes the network framework in this application. FIG. 2 is a schematic diagram of a possible network framework. The network framework includes UE 100, a source access network device 102, a source MEC platform 104, a target access network device 106, a target MEC platform 108, and a cloud server AS 110. A quantity of devices or platforms in the network framework is not limited in this application, and one device or platform is used as an example in the figure.

The UE 100 is configured to access a network using an access network device (which may be specifically the source access network device 102 or the target access network device 106 in the figure), to communicate with the MEC platform or the cloud server AS. When a target application is installed/deployed on each of the MEC platform and the AS, the UE may establish a communication connection to the target application using an access network device (for example, a base station), to perform data exchange with each other, and process service data of the UE using the target application. The target application is an application program used to process the service data of the UE, and may be installed on a device such as a MEC platform (which may be the source MEC platform 104 and/or the target MEC platform 108 in the figure), or the cloud server AS 110. The UE does not perceive whether the target application is deployed on the cloud server AS or the MEC platform.

Optionally, the UE may be a terminal side device such as a mobile phone, a tablet (table personal computer), a personal digital assistant (personal digital assistant, PDA), a mobile internet device (mobile internet device, MID), or a wearable device (wearable device). A specific form or type of the UE is not limited in this application.

The access network device (which may be specifically the source access network device 102 or the target access network device 106) is a network device that connects the UE to a network, and may be configured to determine, based on a signal measurement report reported by the UE, whether the UE needs to be handed over between access network devices. If the UE needs to be handed over between the access network devices, a handover notification may be further sent to the MEC platform correspondingly deployed for the access network device, to notify the MEC platform that the UE is to be handed over between the access network devices. Optionally, one or more MEC platforms may be correspondingly deployed for one or more access network devices, or no MEC platform may be deployed.

Optionally, the source access network device and the target access network device in the figure may be access network devices of a same type or different types, and the access network device includes but is not limited to an evolved NodeB (Evolved NodeB, eNB) and a home evolved NodeB (Home Evolved NodeB, HeNB) on a terrestrial radio access network, a radio network controller (radio network controller, RNC) on a radio access network, a base station controller (base station controller, BSC) on a radio access network, and the like. In the following description of this application, an example in which the access network device is a base station eNB is used to describe related content.

The MEC platform (which may be specifically the source MEC platform 104 or the target MEC platform 108) is deployed nearby the UE side, and a target application is deployed on the MEC platform to process the service data of the UE. When the UE sends a service processing request to a network, the MEC platform may route the service processing request to the target application on the MEC platform according to a preset routing rule for processing.

The cloud server AS 110 is an AS deployed on a cloud network, and may also be configured to process service data of the UE. In actual application, the target application is deployed in the AS, and then the target application is used to process the service data of the UE. Generally, the UE is preconfigured with interconnection information of the AS, for example, an IP address and a communications port of the AS. A movement process of the UE involves a handover between access network devices (for example, base stations eNBs) or MEC platforms corresponding to the access network devices, but an address of the cloud server AS does not change, and data exchange between the UE and the AS at an application layer is not affected.

Figure 3:
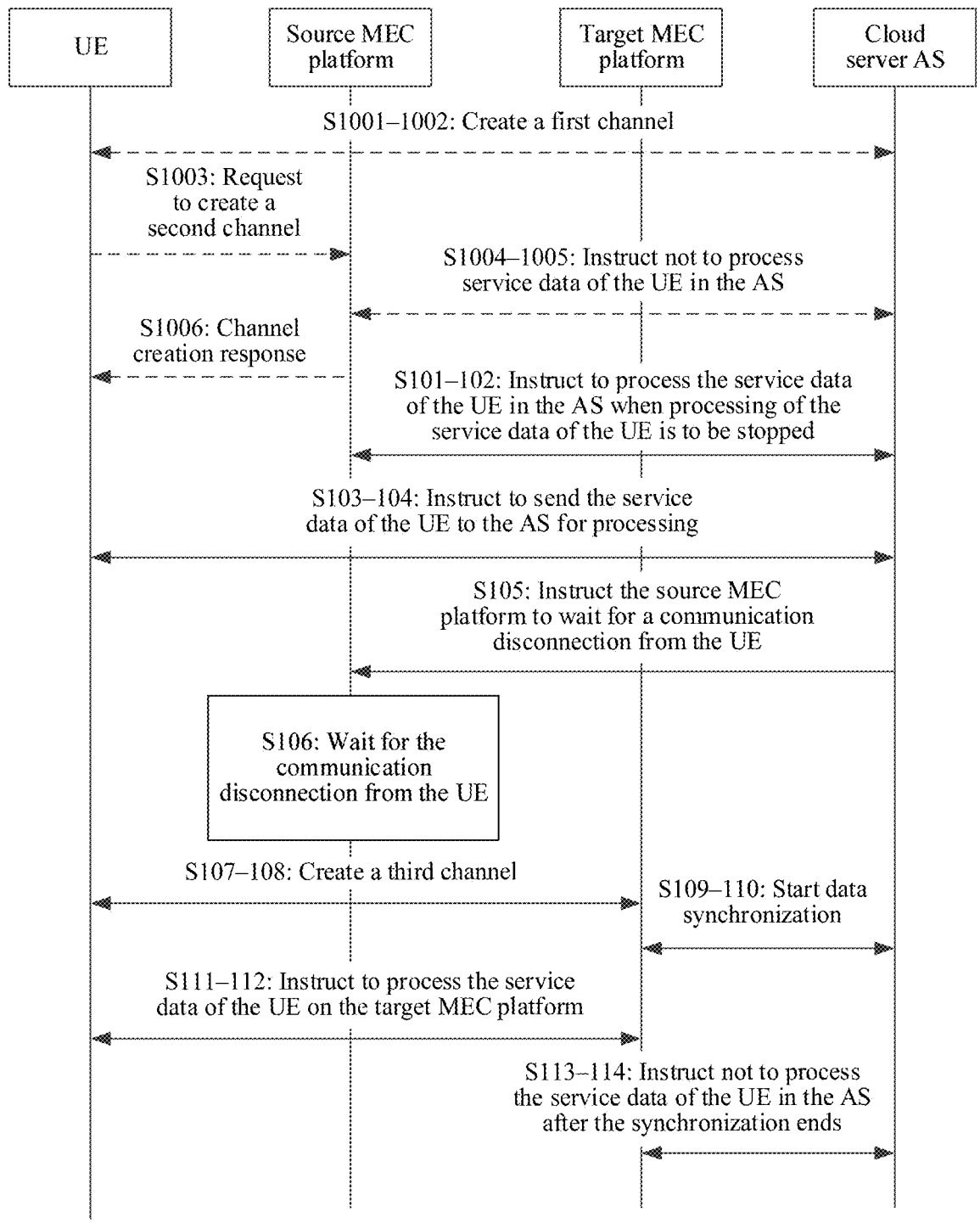
FIG. 3 is a schematic flowchart of a service switching processing method according to an embodiment of the present disclosure.

Based on the network framework shown in FIG. 2, the following describes related embodiments of a service switching processing method in this application. FIG. 3 is a schematic flowchart of a service switching processing method according to an embodiment of the present disclosure. As shown in FIG. 3, the method may include the following implementation steps.

S101 A source MEC platform sends first indication information to a cloud server AS when determining that a target application is to stop processing service data of UE, where the first indication information is used to indicate that the AS is to wait to process the service data of the UE. Correspondingly, the AS receives the first indication information. The target application is deployed on the source MEC platform, and is configured to process the service data of the UE.

The source MEC platform determines that the target application is to stop processing the service data of the UE in the following two implementations In a first implementation, after receiving a handover notification sent by a source base station eNB, the source MEC platform may determine that the target application deployed on the source MEC platform is to stop processing the service data of the UE. The handover notification is used to notify the source MEC platform that the UE is to be handed over from the source base station to a target base station.

Specifically, the UE may report, in real time or periodically, the signal measurement report of the UE to the source base station eNB on which the UE currently camps. The source base station may determine, based on the signal measurement report reported by the UE, that the UE is to be handed over from the source base station eNB to the target base station eNB. For example, whether the UE needs to be handed over from the source base station to the target base station is determined based on signal quality of each cell base station in the signal measurement report. Further, the source base station may further send the handover notification to the source MEC platform, to notify the source MEC platform that the UE is to be handed over from the source eNB to the target eNB. Optionally, the handover notification may carry information such as an identifier of the UE, an identifier of the source eNB, and an identifier of the target eNB. This is not limited in this application.

In a second implementation, when receiving an operation instruction for the target application deployed on the source MEC platform, the source MEC platform may determine that the target application is to stop processing the service data of the UE. The operation instruction includes any one or any combination of an update instruction, an uninstallation/deletion instruction, a reconfiguration instruction, another instruction used to perform a change operation on the target application, or the like. The reconfiguration instruction is used to instruct to reconfigure the target application, for example, reconfigure a parameter or a communications port in the target application.

For example, the operation instruction is an update instruction. When detecting that the user performs an operation such as an upgrade or patching on the target application, the source MEC platform detects the update instruction for the target application. Because the target application cannot provide a service in an upgrade or patching process, the source MEC platform may determine that the target application is to stop processing the service data of the UE.

S102 The cloud server AS responds to the first indication information and sends a first response message to the source MEC platform. The first response message is used to notify/indicate that the AS is ready to wait to process the service data of the UE.

In an optional embodiment, the first indication information is specifically used to instruct the AS to switch a user status to an active state, to wait to process the service data of the UE. Specifically, the target application is also deployed in the AS, and is configured to process the service data of the UE. The target application corresponds to several user states, and the user states represent/indicate different meanings. For example, the active state herein is used to indicate that the target application is to process the service data of the UE. The following describes each user state in detail when the user status is involved.

Correspondingly, the AS may switch the user status (specifically, the user status corresponding to the target application in the AS) to the active state based on an indication of the first indication information. Further, the first response message is sent to the source MEC platform. In this case, the first response message is further used to indicate that the AS has switched the user status to the active state, to wait to process the service data of the UE.

In an optional embodiment, the first indication information is further used to instruct to request to enable a function of data synchronization between the source MEC platform and the AS, that is, start service data synchronization, to synchronize, to the AS for processing, the service data of the UE that is stored on the source MEC platform. In this case, the first indication information may be considered as a synchronization request message.

Correspondingly, after receiving the first indication information, the AS may respond to the first indication information and send the first response message to the source MEC platform. In this case, the first response message is further used to indicate that the function of data synchronization between the source MEC platform and the AS is allowed to be enabled.

Further optionally, data synchronization may be performed between the source MEC platform and the AS. For example, the source MEC platform may send, to the AS for processing, the service data of the UE that is stored on the source MEC platform. Correspondingly, the AS receives the service data of the UE that is sent by the source MEC platform, to perform corresponding processing. For example, the service data is video data. After receiving the video data, the AS may buffer the video data, and the like.

In an optional embodiment, the first indication information is further used to instruct the AS to apply for a first resource that is used by the AS to process the service data of the UE. The first resource herein is mainly used to process the service data of the UE, and may be a computing resource, a storage resource, another resource related to the UE, or the like, for example, a memory resource and a thread resource.

Correspondingly, the AS may apply for the first resource for the UE based on an indication of the first indication information, to process the service data of the UE, and further send the first response message to the source MEC platform. In this case, the first response message is further used to indicate that the AS has applied for the first resource used to process the service data of the UE.

The following describes some optional embodiments in this application.

In an optional embodiment, before step S101, the method may further include the following implementation steps Step S1001 The UE sends a first creation request to the AS, where the first creation request carries a first channel parameter, and is used to request to create a first channel required for communication between the UE and the AS.

Step S1002 After receiving the first creation request, the AS creates the first channel based on the first channel parameter, and sends a first creation response to the UE. The first creation response is used to indicate that the first channel has been successfully created.

The first channel parameter is a parameter required for creating the first channel, and may be interconnection information of the target application deployed in the AS. The interconnection information includes but is not limited to information such as an Internet Protocol (internet protocol, IP) address, a logical port, a user name, a password, a communication protocol, and a communication key in the AS (or the target application in the AS).

The first channel is a channel used for communication between the UE and the AS, and data exchange between the UE and the AS may be implemented on the channel. For example, the UE sends the service data of the UE to the AS on the first channel for processing.

Optionally, before step S101, the method may further include the following implementation steps Step S1003 The UE sends a second creation request to the source MEC platform, where the second creation request carries a second channel parameter, and is used to request to create a second channel required for communication between the UE and the source MEC platform.

Specifically, the second channel parameter is a parameter required for creating the second channel, and may be interconnection information of the target application deployed on the source MEC platform. For the interconnection information, refer to related descriptions in the foregoing embodiments. Details are not described herein again.

The second channel is a channel used for communication between the UE and the source MEC platform, and data exchange between the UE and the source MEC platform may be implemented on the channel. For example, the UE may send the service data of the UE to the source MEC platform on the second channel for processing.

Step S1004 After receiving the first creation request, the source MEC platform creates the first channel based on the first channel parameter, and sends second indication information to the AS. The second indication information is used to instruct not to process the service data of the UE in the AS. Correspondingly, the AS receives the second indication information.

Step S1005 The AS responds to the second indication information and sends a second response message to the source MEC platform, where the second response message is used to indicate that the AS has determined/learned not to process the service data of the UE.

Step S1006 After receiving the second response message, the source MEC platform sends a first creation response to the UE, where the first creation response is used to indicate that the second channel has been successfully created.

In an optional embodiment, the second indication information may be specifically used to instruct the AS to switch the user status to the idle state, to instruct not to subsequently process the service data of the UE in the AS. Correspondingly, the AS responds to the second indication information, switches the user status to the idle state based on an indication of the second indication information, and sends the second response message to the source MEC. In this case, the second response message is further used to indicate that the AS has switched the user status to the idle state.

In an optional embodiment, the second indication information is further used to instruct the AS to release a second resource and reserve a static resource, to reserve/maintain communication between the UE and the AS, and support transmission of a handshake message, that is, a request message and a response message, between the UE and the AS. The second resource is a resource that is used by the AS to process the service data of the UE, and may be a computing resource, a storage resource, or the like. The static resource may be account information and permission information of the UE, and another information resource that is not changed in real time. Correspondingly, the AS responds to the second indication information, releases the second resource based on the indication of the second indication information, and sends the second response message to the source MEC platform. In this case, the second response message is further used to indicate that the AS has released the second resource.

Optionally, the UE may further send a third creation request to a target MEC platform correspondingly deployed for the target eNB, to request to create a third channel required for communication between the UE and the target MEC platform. Details are described below.

It should be noted that the first creation request to the third creation request are all channel creation requests sent by the UE to the target device, to request to correspondingly create a channel used for communication between the UE and the target device, and the service data of the UE is sent to the target device on the channel for processing. The target device is any one or more of the AS, the source MEC platform, or the target MEC platform.

In an optional embodiment, after step S102, the method may further include the following implementation steps Step S103 The AS sends third indication information to the UE, where the third indication information is used to instruct the UE to send the service data of the UE to the AS for processing. Correspondingly, the UE receives the third indication information.

Step S104 The UE responds to the third indication information and sends a third response message to the AS, where the third response message is used to indicate that the UE has determined/learned to send the service data of the UE to the AS for processing.

Specifically, after the service data of the UE starts to be synchronized between the source MEC platform and the AS, or after data synchronization between the source MEC platform and the AS is stable, the third indication information is sent to the UE. Herein, that data synchronization is stable may mean that a rate at which the source MEC platform sends data to the AS reaches a preset rate or falls within a preset rate range. The third indication information may be specifically used to instruct the UE to switch from the original second channel to the first channel such that the service data of the UE is subsequently sent to the AS on the first channel for processing.

Correspondingly, after receiving the third indication information, the UE switches from the second channel to the first channel based on an indication of the third indication information, and sends the third response message to the AS. In this case, the third response message is specifically used to indicate that the UE has switched from the second channel to the first channel, and subsequently the service data of the UE is sent to the AS on the first channel for processing.

Optionally, after the UE switches to the first channel, the UE and the AS may exchange data on the first channel. For example, the UE sends the service data of the UE to the AS on the first channel for processing. Correspondingly, the AS receives and processes the service data of the UE, and may further feed back a processing result to the UE or the like on the first channel.

After the service data of the UE has been synchronized between the source MEC platform and the AS, the method may further include Step S105 The AS sends fourth indication information to the source MEC platform, where the fourth indication information is used to instruct to wait for a communication disconnection between the source MEC platform and the UE. Correspondingly, the source MEC platform receives the fourth indication information.

Step S106 The source MEC platform waits for a communication disconnection from the UE in response to the fourth indication information.

Specifically, after the source MEC platform sends all stored service data of the UE to the AS, that is, after the AS synchronously receives all the service data of the UE, the AS may send the fourth indication information to the source MEC platform. The fourth indication information is used to instruct the source MEC platform to stop synchronizing the service data of the UE, that is, the service data of the UE has been synchronized, and the user status of the target application is switched to a waiting dying state, to wait for a communication disconnection between the source MEC platform and the UE. In this case, the source MEC platform further maintains communication with the UE, that is, maintains the second channel used for communication between the source MEC platform and the UE, to support transmission of a simple handshake message. After the source MEC platform is disconnected from the UE, a channel resource occupied by the second channel is released.

Correspondingly, after receiving the fourth indication information, the source MEC platform switches the user status to the waiting state based on an indication of the fourth indication information, to wait for a communication disconnection between the source MEC platform and the UE.

In an optional embodiment, the fourth indication information is further used to instruct the source MEC platform to release a third resource, reserve a channel resource of the second channel for communication between the source MEC platform and the UE, and release the channel resource after disconnection. The third resource is a resource used by the source MEC platform to process the service data of the UE, and may be a computing resource, a storage resource, or the like. Correspondingly, after receiving the fourth indication information, the source MEC platform releases the third resource based on the indication of the fourth indication information.

In an optional embodiment, after the source MEC platform detects that the UE is handed over from the source MEC platform, or after the target application on the source MEC platform stops processing the service data of the UE, it may be determined that the communication between the source MEC platform and the UE is disconnected, that is, the communication is disconnected.

Specifically, because the second channel for communication is still reserved between the source MEC platform and the UE previously, the UE and the source MEC platform may periodically exchange a handshake message, and this indicates that there is still a channel between the UE and the source MEC platform. Correspondingly, after the source MEC platform receives, within preset duration, no handshake message sent by the UE, it may be determined that the UE has been handed over from the source MEC platform, and communication between the UE and the source MEC platform is disconnected.

Alternatively, when an update operation such as an upgrade or patching is being performed on the target application on the MEC platform, or the target application is deleted/uninstalled, or the like, a service cannot be provided, that is, the service data of the UE stops processing, and it may also be determined that the communication between the source MEC platform and the UE is disconnected.

Further optionally, after the source MEC platform detects/determines that the UE is handed over from the source MEC platform, a channel resource occupied when the source MEC platform communicates with the UE, that is, a channel resource occupied by the second channel, may be released. The channel resource herein may be a resource occupied when the second channel is created, for example, a socket connection resource.

In an optional embodiment, the method may further include the following implementation steps Step S107 The UE sends a third creation request to the target MEC platform, where the third creation request carries a third channel parameter, and is used to request to create a third channel used for communication between the UE and the target MEC platform. Correspondingly, the target MEC platform receives the third creation request.

Step S108 After receiving the third creation request, the target MEC platform creates the third channel based on the third channel parameter, and sends a third creation response to the UE, where the third creation response is used to indicate that the third channel has been successfully created.

Specifically, after the UE is handed over from the source MEC platform to the target MEC platform, or after the target application on the target MEC platform previously stops processing the service data of the UE and now processes the service data of the UE again, the target application is deployed on the target MEC platform, to process the service data of the UE. In this case, the UE may attempt, in real time or periodically, to communicate with the target MEC platform correspondingly deployed for the target eNB, to create the third channel such that the service data of the UE is subsequently transmitted to the target MEC platform on the third channel for processing.

The third channel parameter is a parameter required for creating the third channel, and may be specifically interconnection information of the target application on the target MEC platform. For the interconnection information, refer to related descriptions in the foregoing embodiments. Details are not described herein again. The third channel is a channel used for communication between the UE and the target MEC platform, and data exchange between the UE and the target MEC platform may be implemented on the channel.

Step S109 The target MEC platform sends a data synchronization request to the AS, to request to synchronize, to the target MEC platform, the service data of the UE that is stored in the AS. Correspondingly, the AS receives the data synchronization request.

Step S110 After receiving the data synchronization request, the AS sends a data synchronization response to the target MEC platform. The data synchronization response is used to indicate that data synchronization between the AS and the target MEC platform is allowed.

Specifically, after the third channel is created between the target MEC platform and the UE, the target MEC platform may send the data synchronization request to the AS, to request the AS to synchronize, to the target MEC platform for processing, the stored service data of the UE.

Further optionally, after sending the data synchronization response, the AS may further synchronously send the service data of the UE that is stored in the AS to the target MEC platform for processing. Correspondingly, the target MEC platform receives and processes the service data of the UE.

In an optional embodiment, the method may further include the following implementation steps Step S111 The target MEC platform sends fifth indication information to the UE, where the fifth indication information is used to instruct the UE to send the service data of the UE to the target MEC platform for processing. Correspondingly, the UE receives the fifth indication information.

Step S112 The UE responds to the fifth indication information and sends a fifth response message to the target MEC platform, where the fifth response message is used to indicate that the UE has determined/learned to subsequently send the service data of the UE to the target MEC platform for processing.

Specifically, after the data of the UE starts to be synchronized between the target MEC platform and the AS, or after data synchronization between the target MEC platform and the AS is stable, the target MEC platform may send the fifth indication information to the UE. Herein, that data synchronization is stable means that a rate at which the AS sends data to the target MEC platform reaches a preset rate or falls within a preset rate range. The fifth indication information is specifically used to instruct the UE to switch from the first channel for original communication to the third channel such that the service data of the UE is subsequently sent to the target MEC platform on the third channel for processing.

Correspondingly, after receiving the fifth indication information, the UE switches from the first channel to the third channel based on an indication of the fifth indication information, and sends the fifth response message to the target MEC platform. In this case, the fifth response message is specifically used to indicate that the UE has switched from the first channel to the third channel, and subsequently the service data of the UE is sent to the target MEC platform on the third channel for processing.

Optionally, after the UE switches to the third channel, the UE and the target MEC platform may exchange data on the third channel. For example, the UE sends the service data of the UE to the target MEC platform on the third channel for processing. Correspondingly, the target MEC platform receives and processes the service data of the UE, and may further feed back a processing result to the UE on the third channel, or the like.

In an optional embodiment, after the service data of the UE has been synchronized between the target MEC platform and the AS, the method may further include Step S113 The target MEC platform sends sixth indication information to the AS, where the sixth indication information is used to instruct not to process the service data of the UE in the AS. Correspondingly, the AS receives the sixth indication information.

Step S114 The AS responds to the sixth indication information and sends a sixth response message to the target MEC platform, where the sixth response message is used to indicate that the AS has determined/learned not to process the service data of the UE.

Specifically, after the service data of the UE has been synchronized between the target MEC platform and the AS, the target MEC platform may send the sixth indication information to the AS. The sixth indication information is used to instruct the AS to synchronize the service data of the UE to the target MEC platform, that is, the service data of the UE has been synchronized, and the user status may be switched to the idle idle state, to indicate that the data of the UE is not processed.

Correspondingly, after receiving the sixth indication information, the AS switches the user status to the idle state based on an indication of the sixth indication information, to instruct not to subsequently process the service data of the UE in the AS. Further, the sixth response message is sent to the target MEC platform. In this case, the sixth response message is used to indicate that the AS has switched the user status to the idle state.

In an optional embodiment, the sixth indication information is further used to instruct the AS to release a fourth resource, and reserve a channel resource used when the AS communicates with the UE, that is, a channel resource of the first channel such that after the target application on the target MEC platform subsequently stops processing the service data of the UE, the first channel is enabled again and the service data of the UE is processed using the AS. The fourth resource is a resource used by the AS to process the service data of the UE, and may be a computing resource, a storage resource, or the like. Correspondingly, the AS sends the sixth response message to the target MEC platform. In this case, the sixth response message is further used to indicate that the AS has released the fourth resource.

In an optional embodiment, the first resource to the fourth resource may include but are not limited to a computing resource, a storage resource, or another resource related to the UE, for example, a memory resource and a process resource.

In implementation of this embodiment of the present disclosure, a channel created between UE and a MEC platform is preferentially used to send the service data of the UE to the MEC platform for processing. After stopping processing the service data of the UE, the MEC platform sends the service data of the UE to the AS on the channel established between the UE and the AS, to perform processing. This can resolve the problem in other approaches such as interruption of a service between the UE and the source MEC platform after the UE is handed over from the source MEC platform, and improve reliability and efficiency of service processing.

Figure 4A:
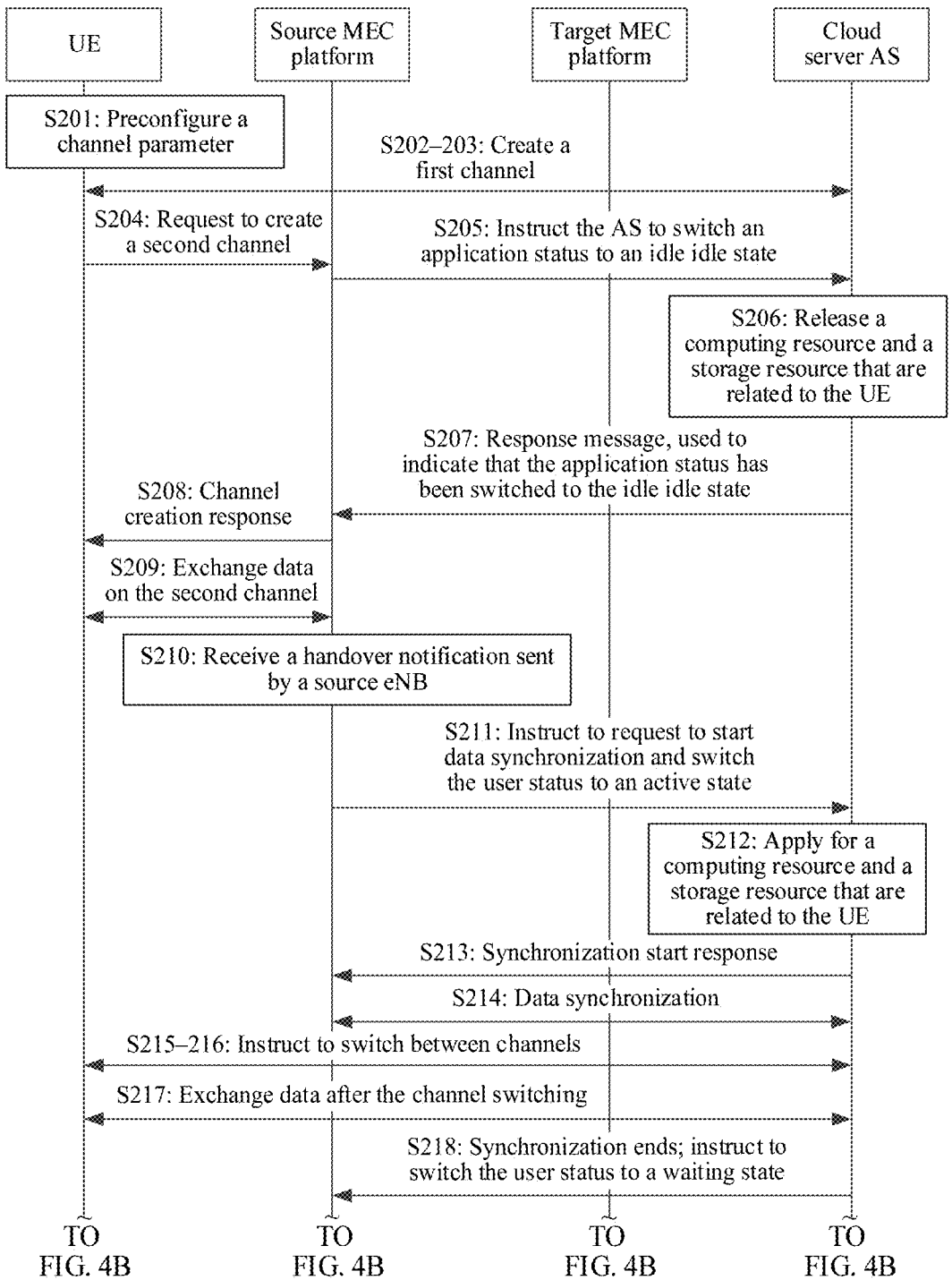
FIG. 4A and FIG. 4B are a schematic flowchart of another service switching processing method according to an embodiment of the present disclosure.
Figure 4B:
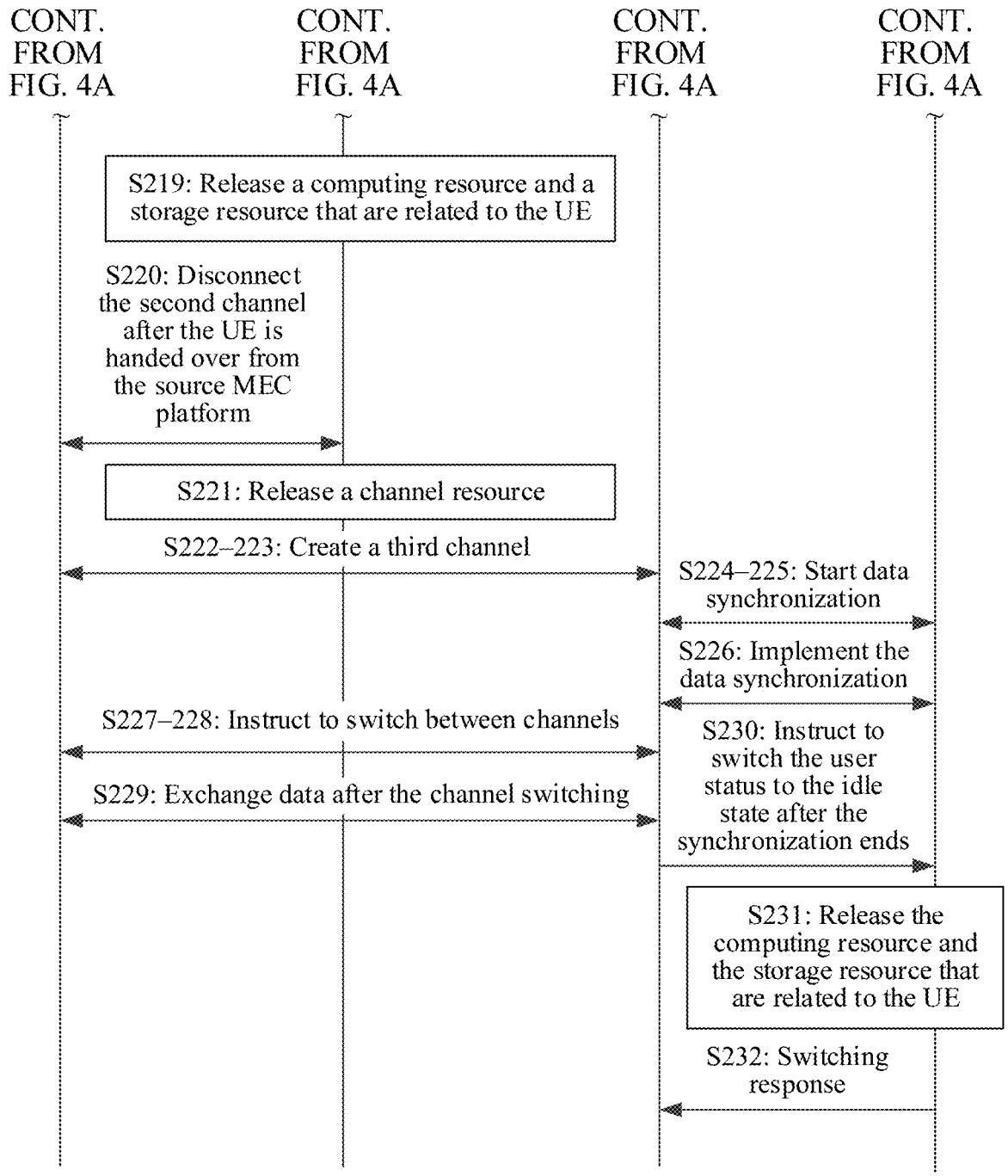

Based on the foregoing embodiments, the following describes related embodiments of two specific service switching processing methods in this application. FIG. 4A and FIG. 4B are a schematic flowchart of another service switching processing method according to an embodiment of the present disclosure. The method shown in FIG. 4A and FIG. 4B includes the following implementation steps.

Step S201 UE preconfigures a channel parameter, where the channel parameter is used to create a channel used for communication between the UE and a target device (for example, a cloud server AS or a network device for which a MEC platform is deployed).

The channel parameter includes a first channel parameter and a second channel parameter, the first channel parameter is used to create a first channel used for communication between the UE and the cloud server AS, and the second channel parameter is used to create a second channel used for communication between the UE and a source MEC platform. Optionally, the channel parameter may further include a third channel parameter, used to create a third channel used for communication between the UE and a target MEC platform.

A target application may be deployed/installed in the target device (which is the AS, the source MEC platform, or the target MEC platform herein), to process service data of the UE. Correspondingly, the UE may transmit the service data of the UE to the target device on a corresponding channel (which may be specifically any one of the first channel to the third channel) for processing.

Correspondingly, the first channel parameter to the third channel parameter may be a same channel parameter or different channel parameters. The channel parameter may be interconnection information required for creating a channel, or may be understood as interconnection information of the target application, and may include but is not limited to an Internet Protocol IP address, a logical communication port, a user name, a password, and the like.

Step S202 The UE sends a first creation request to the AS, where the first creation request carries the first channel parameter, and is used to request to create the first channel used for communication between the UE and the AS.

Step S203 After receiving the first creation request, the AS sends a first creation response to the UE, where the first creation response is used to indicate that the first channel has been successfully created.

Specifically, after receiving the first creation request, the AS creates, based on the first channel parameter, the first channel used for communication between the UE and the AS, and then feeds back the first creation response to the UE.

Step S204 The UE sends a second creation request to the source MEC platform, where the second creation request carries the second channel parameter, and is used to request to create the second channel used for communication between the UE and the source MEC platform.

Step S205 After receiving the second creation request, the source MEC platform sends second indication information to the cloud server AS, to instruct the AS to switch a user status to an idle state, to indicate/notify that the service data of the UE is not subsequently processed in the AS.

Specifically, after receiving the second creation request, the source MEC platform may create, based on the second channel parameter, the second channel used for communication between the UE and the source MEC platform, and send the second indication information to the AS.

Step S206 After receiving the second indication information, the AS may release a computing resource and a storage resource that are related to the UE, and reserve the first channel (that is, reserve a channel resource occupied by the first channel). A static resource herein is a resource that does not change at any time, such as a user account or a password. In addition, the channel resource occupied by the first channel may be reserved, to support transmission of a handshake message between the UE and the source MEC platform, that is, transmission of simple request and response (or acknowledgement) messages.

Step S207 The AS sends a second response message to the source MEC platform, to indicate that the AS has switched the user status to the idle state.

Step S208 After receiving the second response message, the source MEC platform sends a second creation response to the UE, to indicate that the second channel has been successfully created.

Step S209 After the second channel has been successfully created, service initialization succeeds. The UE and the source MEC platform may exchange data on the second channel. For example, the UE sends the service data of the UE to the source MEC platform on the second channel for processing, and the source MEC platform may feed back a processing result to the UE.

Step S210 The source MEC platform receives a handover notification sent by a source base station eNB, where the handover notification is used to notify the source MEC platform that the UE is to be handed over from the source base station to a target base station.

Step S211 After determining, based on the handover notification, that the UE needs to be handed over from the source MEC platform, the source MEC platform sends first indication information to the AS, to instruct to enable a function of data synchronization between the UE and the AS, and instruct the AS to switch the user status to an active state, to instruct to subsequently process the service data of the UE in the AS.

Specifically, after receiving the handover notification, the source MEC platform may further determine whether a target MEC platform correspondingly deployed for the target base station eNB is the same as the source MEC platform. If the target MEC platform is the same as the source MEC platform, the procedure ends. If the target MEC platform is different from the source MEC platform, a subsequent procedure continues, and the first indication information is sent to the AS.

Step S212 After receiving the first indication information, the AS responds to the first indication information, that is, enables the function of data synchronization between the source MEC platform and the AS, and switches the user status to the active state. Optionally, a related computing resource and a related storage resource, for example, a memory resource and a thread resource, may be further applied for the UE, to subsequently use the applied resource to process the service data of the UE.

Step S213 The AS sends a first response message to the source MEC platform, to indicate that the function of data synchronization between the AS and the source MEC platform has been enabled. Optionally, the first response message may be further used to indicate that the AS has switched the user status to the active state, to wait to process the service data of the UE. Optionally, the first response message may be further used to indicate that a related computing resource and a related storage resource have been applied for the UE.

Step S214 After the function of data synchronization has been enabled between the source MEC platform and the AS, data synchronization between the source MEC platform and the AS may be implemented. For example, the source MEC platform may synchronously send, to the AS, the service data of the UE that is stored on the source MEC platform, to process the service data of the UE in the AS.

Step S215 The AS sends third indication information to the UE, to instruct the UE to switch from the second channel for original communication to the first channel such that the service data of the UE is subsequently sent to the AS on the first channel for processing.

Step S216 After receiving the third indication information, the UE responds to the third indication information and sends a third response message to the AS, to indicate that the UE has switched from the second channel to the first channel.

Specifically, after data (that is, the service data of the UE) starts to be synchronized between the source MEC platform and the AS, or after data synchronization between the source MEC platform and the AS is stable, the AS sends the third indication information to the UE, to instruct the UE to subsequently send the service data of the UE to the AS on the first channel for processing. Correspondingly, the UE receives the third indication information, switches from the second channel to the first channel based on an indication of the third indication information, and feeds back the third response message to the AS.

Step S217 After channel switching, the UE and the AS may exchange data on the first channel. For example, the UE may send the service data of the UE to the AS on the first channel for processing.

Step S218 After determining that the service data of the UE has been synchronized between the AS and the source MEC platform, the AS sends fourth indication information to the source MEC platform, to instruct the source MEC platform to switch the user status to a waiting dying state, to wait for a communication disconnection between the source MEC platform and the UE. Optionally, the fourth indication information is further used to instruct the source MEC platform to stop synchronizing the service data of the UE with the AS, and the like.

Step S219 After receiving the fourth indication information, the source MEC platform switches the user status to the waiting state based on an indication of the fourth indication information. Optionally, the source MEC platform may further release a computing resource and a storage resource related to the UE, and reserve a channel resource occupied by the second channel, to support transmission of a simple handshake message, and release, when communication is disconnected, the channel resource occupied by the second channel, for example, a socket resource.

Step S220 After determining that the UE is handed over from the source MEC platform, disconnect communication between the source MEC platform and the UE, that is, disconnect the second channel.

Specifically, after the source MEC platform receives, within specified duration, no handshake message sent by the UE, it may be determined that the UE has been handed over from the source MEC platform, that is, the UE has been handed over from the source base station eNB. The specified duration is self-defined on a user side or a platform side, for example, 10 s, and is not limited.

Step S221 Further, the source MEC platform releases the channel resource occupied by the second channel.

Step S222 After the UE is handed over from the source MEC platform to a target MEC platform, the UE may send a third creation request to the target MEC platform, where the third creation request carries a third channel parameter, and is used to request to create a third channel used for communication between the UE and the target MEC platform.

Specifically, after the UE is handed over to the target MEC platform correspondingly deployed for the target base station, if a target application is deployed on the target MEC platform, the target application is used to process the service data of the UE. In this case, the UE may attempt to establish communication with the target MEC platform in real time or periodically, that is, the UE sends the third creation request to the MEC platform, to create the third channel.

Step S223 After receiving the third creation request, the target MEC platform creates the third channel based on the third channel parameter, and sends a third creation response to the UE, to indicate that the third channel has been successfully created.

In this application, for the first channel parameter, the second channel parameter, and the third channel parameter, refer to related descriptions in the foregoing embodiment. Details are not described herein again.

Step S224 The target MEC platform sends a data synchronization request to the AS, to request to enable a function of data synchronization between the target MEC platform and the AS.

Step S225 After receiving the data synchronization request, the AS sends a data synchronization response to the target MEC platform, to indicate that the function of data synchronization between the target MEC platform and the AS is allowed to be enabled, and data synchronization may be performed between the target MEC platform and the AS.

Step S226 Data synchronization may be implemented between the AS and the target MEC platform. For example, the AS synchronously sends the service data of the UE that is stored in the AS to the target MEC platform for processing.

Step S227 The target MEC platform sends fifth indication information to the UE, to instruct the UE to switch from the first channel originally used for communication to the third channel such that the UE subsequently sends the service data of the UE to the target MEC platform on the third channel for processing.

Step S228 After receiving the fifth indication information, the UE responds to the fifth indication information and sends a fifth response message to the target MEC platform, where the fifth response message is used to indicate that the UE has switched from the first channel to the third channel.

Specifically, after data (that is, the service data of the UE) starts to be synchronized between the target MEC platform and the AS, or after data synchronization between the target MEC platform and the AS is stable, the target MEC platform sends the fifth indication information to the UE, to instruct the UE to subsequently send the service data of the UE to the target MEC platform on the third channel for processing. Correspondingly, the UE receives the fifth indication information, switches from the first channel to the third channel based on an indication of the fifth indication information, and feeds back the fifth response message to the target MEC platform.

Step S229 After channel switching, the UE and the target MEC platform may exchange data on the third channel. For example, the UE may subsequently send the service data of the UE to the target MEC platform on the third channel for processing. Correspondingly, the target MEC platform may feed back a processing result to the UE or the like.

Step S230 After determining that the service data of the UE has been synchronized between the target MEC platform and the AS, the target MEC platform sends sixth indication information to the AS to instruct the AS to switch the user status to an idle idle state, to instruct not to subsequently process the service data of the UE in the AS. Optionally, the sixth indication information is further used to instruct the AS to stop synchronizing the service data of the UE with the target MEC platform, and the like.

Step S231 After receiving the sixth indication information, the AS switches the user status to the idle state based on an indication of the sixth indication information. Optionally, the AS may further release a computing resource and a storage resource related to the UE, and reserve a channel resource (such as a socket resource) occupied by the first channel, to support transmission of a simple handshake message, and enable the first channel again when the UE is handed over from the target MEC platform next time, to process the service data of the UE using the AS.

Step S232 The AS sends a sixth response message to the target MEC platform, to indicate that the AS has switched the user status to the idle state, and optionally, further to indicate that the AS has released a computing resource, a storage resource, and the like related to the UE.

Implementing this embodiment of the present disclosure can resolve problems such as service interruption and communication interruption that may occur when the service data needs to be migrated from the source MEC platform to the target MEC platform for processing because the UE is handed over between the base stations eNBs.

Figure 5A:
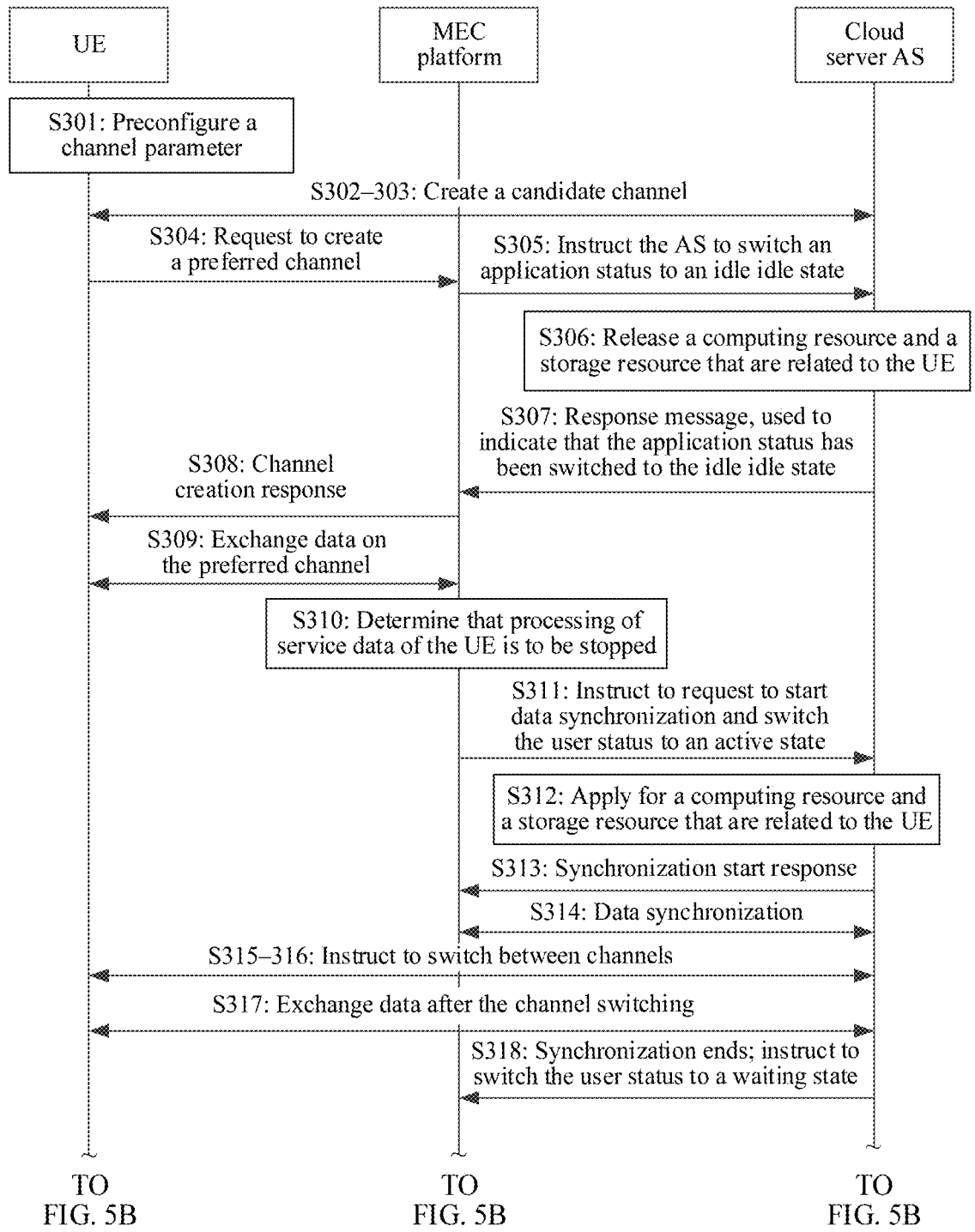
FIG. 5A and FIG. 5B are a schematic flowchart of another service switching processing method according to an embodiment of the present disclosure.
Figure 5B:
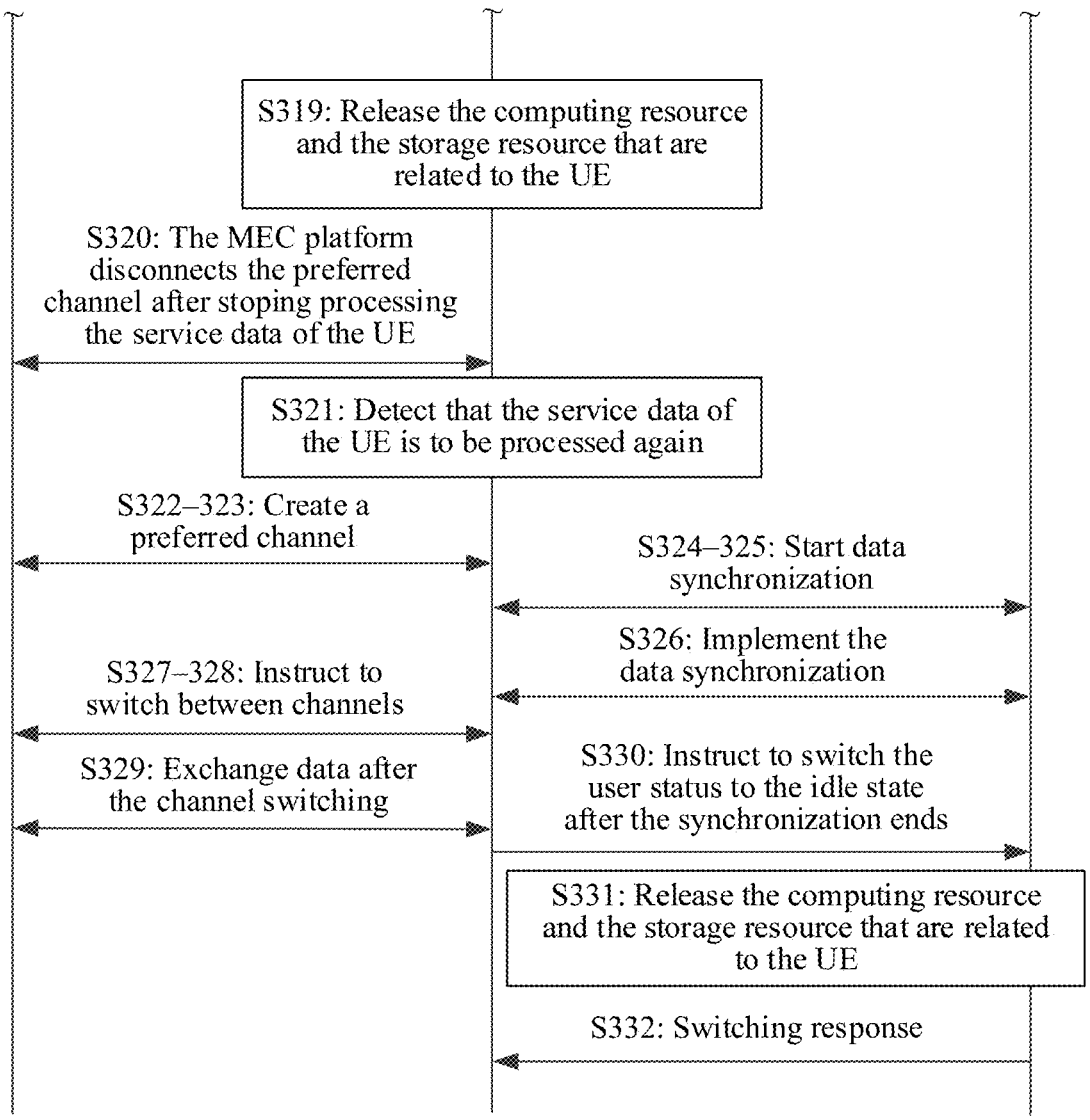

FIG. 5A and FIG. 5B are a schematic flowchart of another service switching processing method according to an embodiment of the present disclosure. The method shown in FIG. 5A and FIG. 5B includes the following implementation steps.

Step S301 UE preconfigures a channel parameter, where the channel parameter is used to create a channel required for communication between the UE and a target device.

The channel parameter may include a preferred channel parameter and a candidate channel parameter. The preferred channel parameter is used to create preferred communication used for communication between the UE and the MEC platform, for example, the second channel and the third channel in the foregoing embodiment. The candidate channel parameter is used to create a candidate channel used for communication between the UE and the AS, for example, the first channel in the foregoing embodiment.

A target application is deployed/installed in the target device (which is the AS or the MEC platform herein), and is configured to process the service data of the UE. Correspondingly, the service data of the UE may be transmitted to the target device on a channel (which may be specifically a preferred channel or a candidate channel) for processing.

Correspondingly, the preferred channel parameter and the candidate channel parameter may be channel parameters required for creating a channel, or may be understood as interconnection information of the target application in the target device, and may include but is not limited to an Internet Protocol IP address, a logical communication port, a user name, a password, and the like.

Step S302 The UE sends a candidate creation request to the cloud server AS, where the candidate creation request carries a candidate channel parameter, and is used to request to create a candidate channel required for communication between the UE and the AS.

Step S303 After receiving the candidate creation request, the AS sends a candidate creation response to the UE, to indicate that the candidate channel has been successfully created. Specifically, after receiving the candidate creation request, the AS creates the candidate channel based on the candidate channel parameter such that the AS and the UE subsequently exchange data on the candidate channel.

Step S304 The UE sends a preferred creation request to a MEC platform, where the preferred creation request carries a preferred channel parameter, and is used to request to create a preferred channel required for communication between the UE and the MEC platform.

It should be noted that the MEC platform in this embodiment includes but is not limited to the source MEC platform, the target MEC platform, another platform supporting processing of the service data of the UE, or the like.

Step S305 After receiving the preferred creation request, the MEC platform sends second indication information to the cloud server AS, to instruct the AS to switch a user status to an idle state, to indicate/notify that the service data of the UE is not subsequently processed in the AS.

Step S306 After receiving the second indication information, the AS may release a computing resource and a storage resource related to the UE, and reserve the candidate channel (that is, reserve a channel resource occupied by the candidate channel).

Step S307 The AS sends a second response message to the MEC platform, to indicate that the AS has switched the user status to the idle state.

Step S308 After receiving the second response message, the MEC platform sends a second creation response to the UE, to indicate that the candidate channel has been successfully created.

Step S309 After the preferred channel has been successfully created, service initialization succeeds. The UE and the MEC platform may exchange data on the preferred channel.

Step S310 The MEC platform determines that the target application is to stop processing the service data of the UE.

Specifically, after detecting/receiving the operation instruction for the target application, the MEC platform may determine that the target application on the MEC platform is to stop processing the service data of the UE. The operation instruction includes but is not limited to any one or any combination of the following an update instruction, a deletion/uninstallation instruction, a reconfiguration instruction, another instruction used to change the target application, and the like. The update instruction is used as an example. After detecting that the user/system periodically performs an upgrade or patch operation on the target application, the MEC platform detects an update instruction for the target application. Because the target application cannot provide a service in an upgrade/patch process, it may be determined that the target application is to stop processing the service data of the UE.

Step S311 After determining that the target application is to stop processing the service data of the UE, the MEC platform sends first indication information to the AS to instruct to enable a function of data synchronization between the UE and the AS and instruct the AS to switch the user status to an active state, to instruct to subsequently process the service data of the UE in the AS.

Step S312 After receiving the first indication information, the AS enables the function of data synchronization between the MEC platform and the AS in response to the first indication information, and switches the user status to the active state. Optionally, a related computing resource and a related storage resource may be further applied for the UE, to use the applied resource to process the service data of the UE.

Step S313 The AS sends a first response message to the MEC platform, to indicate that the function of data synchronization between the AS and the MEC platform has been enabled.

Step S314 After the function of data synchronization has been enabled between the MEC platform and the AS, data synchronization between the MEC platform and the AS may be implemented. For example, the MEC platform may synchronously send, to the AS, the service data of the UE that is stored on the MEC platform, to process the service data of the UE in the AS.

Step S315 The AS sends third indication information to the UE, to instruct the UE to switch from the preferred channel for original communication to the candidate channel such that the service data of the UE is subsequently sent to the AS on the candidate channel for processing.

Step S316 After receiving the third indication information, the UE responds to the third indication information and sends a third response message to the AS, to indicate that the UE has switched from the preferred channel to the candidate channel.

Step S317 After channel switching, the UE and the AS may exchange data on the first channel. For example, the UE may send the service data of the UE to the AS on the first channel for processing.

Step S318 After determining that the service data of the UE has been synchronized between the AS and the MEC platform, the AS sends fourth indication information to the MEC platform, to instruct the MEC platform to switch the user status to a waiting dying state.

Step S319 After receiving the fourth indication information, the MEC platform switches the user status to the waiting state based on an indication of the fourth indication information. Optionally, the MEC platform may further release a computing resource and a storage resource related to the UE, and reserve a channel resource occupied by the preferred channel.

Step S320 After determining that the target application stops processing the service data of the UE, the MEC platform disconnects communication between the MEC platform and the UE, that is, disconnects the preferred channel.

Step S321 The MEC platform detects that the target application is to process the service data of the UE again.

Step S322 The UE sends the preferred creation request to the MEC platform again, where the preferred creation request carries the preferred channel parameter, and is used to request to create the preferred channel required for communication between the UE and the MEC platform.

Specifically, after the communication between the UE and the MEC platform is disconnected, the UE may attempt to communicate with the MEC platform again periodically/in real time. After the MEC platform detects that the target application is to process the service data of the UE again, the UE and the MEC platform may successfully establish a communication connection again.

Step S323 After receiving the preferred creation request, the MEC platform creates the preferred channel based on the preferred channel parameter, and sends a preferred creation response to the UE, to indicate that the preferred channel has been successfully created.

Step S324 The MEC platform sends a data synchronization request to the AS, to request to enable a function of data synchronization between the MEC platform and the AS.

Step S325 After receiving the data synchronization request, the AS sends a data synchronization response to the MEC platform, to indicate that the function of data synchronization between the MEC platform and the AS is allowed to be enabled, and data synchronization may be performed between the MEC platform and the AS.

Step S326 Data synchronization may be implemented between the AS and the MEC platform. For example, the AS synchronously sends the service data of the UE that is stored in the AS to the MEC platform for processing.

Step S327 The MEC platform sends fifth indication information to the UE, to instruct the UE to switch from the candidate channel originally used for communication to the preferred channel such that the UE subsequently sends the service data of the UE to the MEC platform on the preferred channel for processing.

Step S328 After receiving the fifth indication information, the UE responds to the fifth indication information and sends a fifth response message to the MEC platform, to indicate that the UE has switched from the candidate channel to the preferred channel.

Step S329. After channel switching, the UE and the MEC platform may exchange data on the preferred channel.

Step S330 After determining that the service data of the UE has been synchronized between the MEC platform and the AS, the MEC platform sends sixth indication information to the AS to instruct the AS to switch the user status to the idle idle state, to instruct not to subsequently process the service data of the UE in the AS.

Step S331 After receiving the sixth indication information, the AS switches the user status to the idle state based on an indication of the sixth indication information. Optionally, the AS may further release a computing resource and a storage resource related to the UE, and reserve a channel resource (for example, a socket resource) occupied by the candidate channel.

Step S332 The AS sends a sixth response message to the MEC platform, to indicate that the AS has switched the user status to the idle state, and optionally, further to indicate that the AS has released a computing resource, a storage resource, and the like related to the UE.

Implementing this embodiment of the present disclosure can resolve a problem such as service interruption that may occur after the target application on the MEC platform stops processing the service data of the UE (that is, stops providing a service).

The foregoing mainly describes the solutions provided in the embodiments of the present disclosure from a perspective of interaction between devices (which may be UE and a cloud server AS) and a MEC platform. In actual application, the MEC platform (which may be the source MEC platform and/or the target MEC platform in this application) may be used as a network device and deployed on a network. It may be understood that, to implement the foregoing functions, a first device (which may be specifically UE or a network device, and the network device herein may be specifically a cloud server, or a network device configured to deploy the source MEC platform or the target MEC platform) includes corresponding hardware structures and/or software modules for performing the functions. In combination with the examples described in the embodiments disclosed in the present disclosure, the units and algorithm steps can be implemented in a form of hardware or a combination of hardware and computer software in the embodiments of the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of the present disclosure.

In the embodiments of the present disclosure, the first device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that division into the units in the embodiments of the present disclosure is an example, is merely logical function division and may be other division in actual implementation.

Figure 6A:
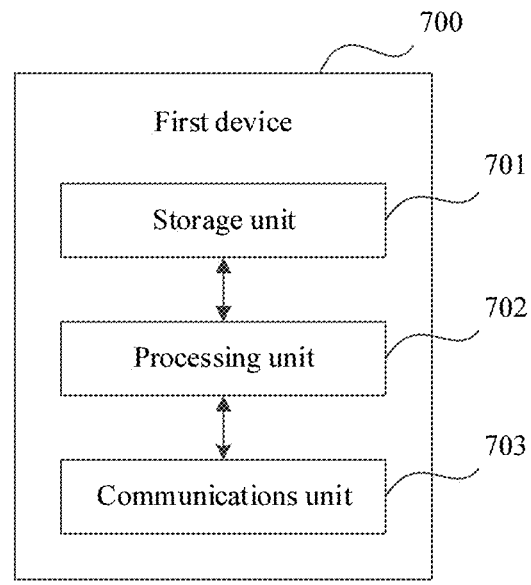
FIG. 6A is a schematic structural diagram of a first device according to an embodiment of the present disclosure.

When an integrated unit is used, FIG. 6A is a possible schematic structural diagram of the first device in the foregoing embodiments. A first device 700 includes a processing unit 702 and a communications unit 703. The processing unit 702 is configured to control and manage an action of the first device 700.

In a possible embodiment, when the first device 700 is UE 700, the processing unit 702 is configured to support the first device 700 in performing steps S201 and S216 in FIG. 4A and FIG. 4B, steps S301 and S316 in FIG. 5A and FIG. 5B, and/or another step of the technology described in this specification. The communications unit 703 is configured to support the first device 700 in communicating with another device. For example, the communications unit 703 is configured to support the first device 700 in performing steps S1001, S1003, S1006, S104, S107, and S111 in FIG. 3, steps S202, S204, S208, S209, S215, S217, S222, S227, and S229 in FIG. 4A and FIG. 4B, steps S302, S304, S308, S309, S315, S317, S322, S327, and S329 in FIG. 5A and FIG. 5B, and/or another step of the technology described in this specification.

In a possible embodiment, when the first device 700 is a cloud server 700, the processing unit 702 is configured to support the first device 700 in performing steps S102 and S104 in FIG. 3, steps S206, S212, and S231 in FIG. 4A and FIG. 4B, and steps S306, S312, and S331 in FIG. 5A and FIG. 5B, and/or another step of the technology described in this specification. The communications unit 703 is configured to support the first device 700 in communicating with another device. For example, the communications unit 703 is configured to support the first device 700 in performing steps S1002, S1005, S104, S105, S110, and S114 in FIG. 3, steps S207, S213, S214, S215, S217, S218, S225, S226, and S232 in FIG. 4A and FIG. 4B, steps S307, S313, S314, S315, S317, S318, S325, S326, and S332 in FIG. 5A and FIG. 5B, and/or another step of the technology described in this specification.

In a possible embodiment, when the first device 700 is a network device 700 configured to deploy a source MEC platform, the processing unit 702 is configured to support the first device 700 in performing step S106 in FIG. 3, steps S210, S219, and S221 in FIG. 4A and FIG. 4B, steps S310, S319, and S321 in FIG. 5A and FIG. 5B, and/or another step of the technology described in this specification. The communications unit 703 is configured to support the first device 700 in communicating with another device. For example, the communications unit 703 is configured to support the first device 700 in performing steps S1004 and S1006 in FIG. 3, steps S205, S209, and S211 in FIG. 4A and FIG. 4B, steps S305, S309, S311, S327, S329, and S330 in FIG. 5A and FIG. 5B, and/or another step of the technology described in this specification.

In a possible embodiment, when the first device 700 is a network device 700 configured to deploy a target MEC platform, the processing unit 702 is configured to support the first device 700 in performing step S108 in FIG. 3, step S223 in FIG. 4A and FIG. 4B, step S323 in FIG. 5A and FIG. 5B, and/or another step of the technology described in this specification. The communications unit 703 is configured to support the first device 700 in communicating with another device. For example, the communications unit 703 is configured to support the first device 700 in performing steps S109, S111, and S113 in FIG. 3, steps S224, S226, S227, S229, and S230 in FIG. 4A and FIG. 4B, steps S305, S308, S311, S314, S324, S326, S327, S329, and S330 in FIG. 5A and FIG. 5B, and/or another step of the technology described in this specification.

Optionally, the first device 700 may further include a storage unit 701 configured to store program code and data of the first device 700.

The processing unit 702 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processor/controller may implement or execute various example logical blocks, modules, and circuits described with reference to content disclosed in the present disclosure. The processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a generic term, and may include one or more interfaces, for example, an interface between a network device and another device. The storage unit 701 may be a memory.

Figure 6B:
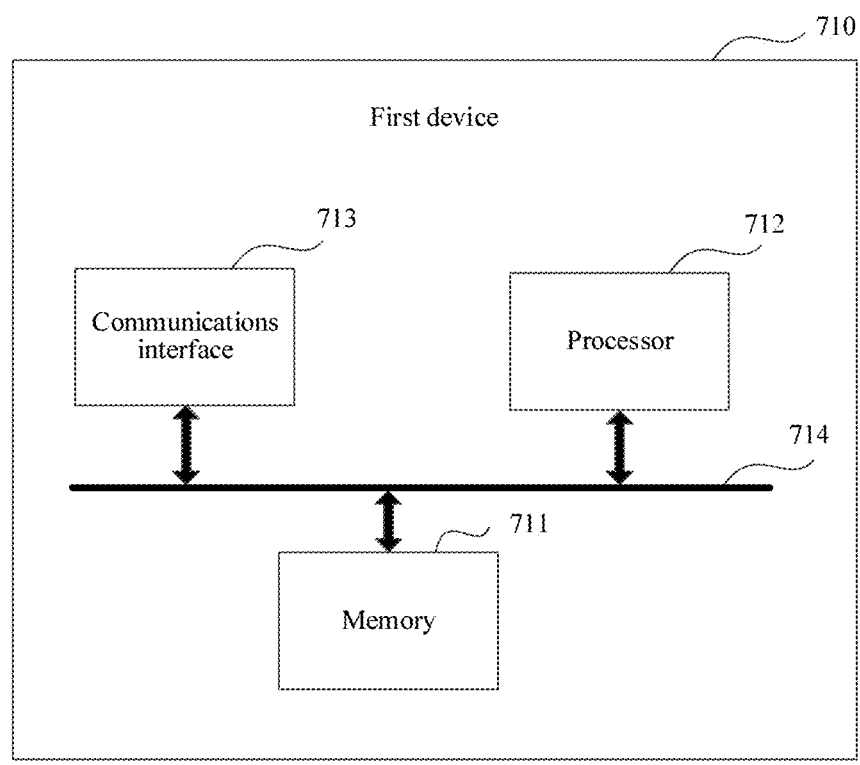
FIG. 6B is a schematic structural diagram of another first device according to an embodiment of the present disclosure.

When the processing unit 702 is the processor, the communications unit 703 is the communications interface, and the storage unit 701 is the memory, the first device in the embodiments of the present disclosure may be a first device shown in FIG. 6B.

As shown in FIG. 6B, the first device 710 includes a processor 712, a communications interface 713, and a memory 77. Optionally, the first device 710 may further include a bus 714. The communications interface 713, the processor 712, and the memory 77 may be connected to each other using the bus 714. The bus 714 may be a peripheral component interconnect (Peripheral Component Interconnect, PCI for short) bus, an extended industry standard architecture (Extended Industry Standard Architecture, EISA for short) bus, or the like. The bus 714 may be classified as an address bus, a data bus, a control bus, or the like. For ease of representation, only one thick line is used to represent the bus 714 in FIG. 6B, but this does not mean that there is only one bus or only one type of bus.

For specific implementation of the first device shown in FIG. 6A or FIG. 6B, refer to corresponding descriptions in the foregoing method embodiments. Details are not described herein again.

The methods or algorithm steps described in combination with the content disclosed in the embodiments of the present disclosure may be implemented by hardware, or may be implemented by a processor executing a software instruction. The software instruction may include a corresponding software module. The software module may be stored in a random access memory (Random Access Memory, RAM), a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in an ASIC. In addition, the ASIC may be located in a network device. Certainly, the processor and the storage medium may exist in the first device as discrete components.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be included. The foregoing storage medium includes any medium that can store program code, such as a ROM, a RAM, a magnetic disk, or an optical disc.

What is claimed is:

1. A service switching processing system, comprising:
a source mobile edge computing (MEC) platform; and
an application server (AS) coupled to the source MEC,
wherein the source MEC platform is configured to:
determine whether a target application is to stop processing service data of a user equipment (UE); and
send first indication information to the AS when the target application is to stop processing the service data, wherein the first indication information indicates that the service data is to be processed in the AS, and wherein the target application is deployed on the source MEC platform for processing the service data of the UE,
wherein the AS is configured to:
receive the first indication information from the source MEC platform; and
send, to the source MEC platform in response to the first indication information, a first response message that indicates the AS is ready to process the service data.

2. The service switching processing system of claim 1, wherein the source MEC platform is further configured to obtain an operation instruction for the target application or receive a handover notification from a base station, wherein the operation instruction comprises at least one of an update instruction, an uninstallation instruction, or a reconfiguration instruction.

3. The service switching processing system of claim 1, wherein the first indication information instructs the AS to switch a user status to an active state to wait to process the service data, wherein the user status indicates whether the service data of the UE is processed in the AS, and wherein the AS is further configured to:
switch the user status to the active state based on an indication of the first indication information; and
send the first response message to the source MEC platform, wherein the first response message is further used to indicate that the AS has switched the user status to the active state.

4. The service switching processing system of claim 1, further comprising the UE, wherein before the source MEC platform sends the first indication information to the AS, the source MEC platform is further configured to:
receive a creation message requesting to create a channel for communication between the UE and the source MEC platform; and
send second indication information to the AS in response to receiving the creation message, wherein the second indication information instructs the AS to not process the service data, and
wherein the AS is further configured to send, to the source MEC in response to the second indication information, by sending a second response message that indicates the AS has determined not to process the service data of the UE.

5. The service switching processing system of claim 4, wherein the second indication information instructs the AS to switch its user status to an idle state to not process the service data, and wherein the AS is further configured to:
switch the user status to the idle state based on an indication of the second indication information; and
send, to the source MEC platform, the second response message that indicates the AS has switched the user status to the idle state.

6. The service switching processing system of claim 1, further comprising the UE, wherein after the service data starts to be synchronized between the source MEC platform and the AS, the AS is further configured to send third indication information to the UE, wherein the third indication information instructs the UE to send the service data to the AS for processing, and
wherein the UE is configured to:
receive the third indication information from the AS; and
send, to the AS in response to the third indication information, a third response message indicating that the UE has determined to send the service data to the AS for processing.

7. The service switching processing system of claim 6, wherein the third indication information instructs the UE to switch from a second channel to the first channel to send the service data to the AS on the first channel for processing, wherein the first channel is between the UE and the AS, wherein the second channel is between the UE and the source MEC platform, and wherein the third response message indicates that the UE has switched from the second channel to the first channel.

8. The service switching processing system of claim 1, wherein after the service data has been synchronized between the source MEC platform and the AS, the AS is further configured to send fourth indication information to the source MEC platform, wherein the fourth indication information instructs the source MEC to wait for a communication disconnection between the source MEC platform and the UE, and wherein the source MEC platform is further configured to wait for the communication disconnection between the source MEC platform and the UE based on the fourth indication information.

9. The service switching processing system of claim 8, wherein the fourth indication information instructs the source MEC platform to switch a user status of the target application to a waiting state and to wait for the communication disconnection between the source MEC platform and the UE, and wherein the source MEC platform is further configured to switch the user status to the waiting state based on the fourth indication information.

10. The service switching processing system of claim 9, wherein after detecting that the UE has left the source MEC platform, the source MEC platform is further configured to release a channel resource occupied between the source MEC platform and the UE.

11. The service switching processing system of claim 1, further comprises comprising:

a target MEC platform comprising the target application; and the UE configured to send a creation request to the target MEC platform when the source MEC platform releases the UE to the target MEC platform or when the target application supports processing of the service data, wherein the creation request carries a channel parameter that requests creating a third channel used for communication between the UE and the target MEC platform, and wherein the target MEC platform is configured to:
  receive the creation request;
  create the third channel based on the channel parameter; and
  send a creation response to the UE that indicates the third channel has been successfully created.

12. The service switching processing system of claim 11, further comprising the UE, wherein after the service data starts to be synchronized between the target MEC platform and the AS, the target MEC platform is further configured to send fifth indication information to the UE, wherein the fifth indication information instructs the UE to send the service data to the target MEC platform for processing, wherein the UE is further configured to:
  determine whether to send the service data to the target MEC platform; and
  respond to the fifth indication information by sending a fifth response message to the target MEC platform that indicates the UE has determined to send the service data to the target MEC platform for processing.

13. The service switching processing system of claim 12, wherein the system further comprises the UE, wherein the fifth indication information instructs the UE to switch from a second channel to the third channel for sending the service data to the target MEC platform on the third channel for processing, and
  wherein the UE is further configured to:
    switch from the second channel to the third channel based on an indication of the fifth indication information; and
    send the fifth response message to the target MEC platform, wherein the fifth response message indicates that the UE has switched from the second channel to the third channel.

14. The service switching processing system of claim 12, wherein after the service data of the UE has been synchronized between the target MEC platform and the AS, the target MEC platform is further configured to send sixth indication information to the AS, wherein the sixth indication information instructs the AS to not process the service data, and
  wherein the AS is further configured to respond to the sixth indication information by sending a sixth response message to the target MEC platform, wherein the sixth response message indicates that the AS has determined not to process the service data of the UE.

15. A service switching processing method, implemented by an application server (AS), wherein the service switching processing method comprises:

receiving first indication information from a source mobile edge computing (MEC) platform, wherein the first indication information indicates that service data of a user equipment (UE) is to be processed in the AS;

sending, to the source MEC platform in response to the first indication information, a first response message indicating that the AS is ready to process the service data; and switching a user status of the AS to an active state based on an indication of the first indication information to wait to process the service data when the first indication information instructs the AS to switch the user status to the active state, wherein the user status indicates whether the service data is processed in the AS, and wherein the first response message further indicates that the AS has switched the user status to the active state.

16. The service switching processing method of claim 15, wherein before the AS receives the first indication information, the method further comprises:
  receiving second indication information from the source MEC platform, wherein the second indication information instructs the AS to not process the service data; and
  sending, to the source MEC platform in response to the second indication information, a second response message indicating that the AS has determined not to process the service data.

17. The service switching processing method of claim 15, wherein after the AS starts synchronizing the service data between the source MEC platform and the AS, the method further comprises:
  sending third indication information to the UE, wherein the third indication information instructs the UE to send the service data to the AS for processing; and
  receiving a third response message from the UE that indicates the UE has determined to send the service data of the UE to the AS.

18. The service switching processing method of claim 15, wherein after the AS has synchronized the service data between the source MEC platform and the AS, the method further comprises sending fourth indication information to the source MEC platform, wherein the fourth indication information instructs the source MEC platform to wait for a communication disconnection between the source MEC platform and the UE.

19. The service switching processing method of claim 15, wherein after the service data has been synchronized between a target MEC platform and the AS, the method further comprises:
  receiving sixth indication information from the target MEC platform, wherein the sixth indication information instructs the AS to not process the service data of the UE; and
  responding to the sixth indication information by sending a sixth response message to the target MEC platform, wherein the sixth response message indicates that the AS has determined to not process the service data of the UE.

* * * * *